(12) United States Patent
Saito et al.

(10) Patent No.: US 11,483,459 B2
(45) Date of Patent: Oct. 25, 2022

(54) CAMERA MODULE THAT DRIVES IMAGE SENSOR

(71) Applicant: ROHM Co., LTD., Kyoto (JP)

(72) Inventors: Akihito Saito, Kyoto (JP); Yoshihiro Sekimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/123,272

(22) Filed: Dec. 16, 2020

(65) Prior Publication Data

US 2021/0195073 A1 Jun. 24, 2021

(30) Foreign Application Priority Data

Dec. 20, 2019 (JP) .............................. JP2019-230761

(51) Int. Cl.
*H04N 5/225* (2006.01)
*G02B 7/09* (2021.01)
*G02B 27/64* (2006.01)
*H04N 5/232* (2006.01)

(52) U.S. Cl.
CPC ............. *H04N 5/2254* (2013.01); *G02B 7/09* (2013.01); *G02B 27/646* (2013.01); *H04N 5/2253* (2013.01); *H04N 5/23287* (2013.01)

(58) Field of Classification Search
CPC .... H04N 5/2254; H04N 5/2253; H04N 5/232; H04N 5/23258; H04N 5/23287; G02B 7/09; G02B 27/646
See application file for complete search history.

(56) References Cited

U.S. PATENT DOCUMENTS

| | | | | |
|---|---|---|---|---|
| 2011/0103782 | A1* | 5/2011 | Tsuruta | G03B 17/00 396/55 |
| 2016/0073027 | A1* | 3/2016 | Noguchi | G02B 27/646 348/208.6 |
| 2016/0241787 | A1* | 8/2016 | Sekimoto | G03B 5/02 |
| 2018/0321503 | A1* | 11/2018 | Brown | G02B 27/646 |
| 2019/0020822 | A1* | 1/2019 | Sharma | H02K 41/0356 |
| 2021/0080806 | A1* | 3/2021 | Xuepeng | H04N 5/2254 |

FOREIGN PATENT DOCUMENTS

| | | |
|---|---|---|
| JP | 2011065140 | 3/2011 |
| JP | 2012037549 | 2/2012 |
| JP | 2014048533 | 3/2014 |
| JP | 2014127766 | 7/2014 |
| JP | 2011232707 | 11/2017 |

* cited by examiner

*Primary Examiner* — Padma Haliyur
(74) *Attorney, Agent, or Firm* — Chip Law Group

(57) ABSTRACT

Disclosed is a camera module including an imaging lens supported in such a manner as to be displaceable in a first direction, an image sensor supported in such a manner as to be displaceable in a second direction different from the first direction, a first actuator that carries out positioning of the imaging lens in the first direction, and a second actuator that carries out positioning of the image sensor in the second direction. Autofocus operation is carried out by one of the first actuator, and the second actuator and optical image stabilization operation is carried out by the other of the first actuator and the second actuator.

12 Claims, 23 Drawing Sheets

CAMERA MODULE THAT DRIVES IMAGE SENSOR

CROSS REFERENCE TO RELATED APPLICATIONS

This application claims priority benefit of Japanese Patent Application No. JP 2019-230761 filed in the Japan Patent Office on Dec. 20, 2019. Each of the above-referenced applications is hereby incorporated herein by reference in its entirety.

BACKGROUND

The present disclosure relates to a camera module.

In recent years, in camera modules mounted in smartphones and so forth, camera modules that incorporate a function of controlling the position of an imaging lens or an image sensor with high accuracy at high speed by detecting the relative position (amount of displacement) between the imaging lens and the image sensor and feeding back this position information have been increasing. In particular, by incorporating feedback control as optical image stabilization (OIS), high-accuracy image stabilization is enabled. Therefore, cameras that employ OIS will increase also in the future along with increase in demand to photograph a remote subject at a dark place without blur.

Meanwhile, an autofocus (AF) function has been already employed in most camera modules and focusing is carried out by changing the relative position between the imaging lens and the image sensor according to the distance to a subject. Regarding the AF function, camera modules that incorporate feedback control and camera modes that do not incorporate it exist. However, camera modules that aim for high-speed focus pull-in and enhancement in the accuracy of keeping of the focal position by incorporating the feedback control are increasing.

As above, the imaging lens or the image sensor needs to be driven for causing the OIS and AF functions to work, and an actuator for this purpose is mounted. In recent years, increase in the number of pixels as the camera has been rapidly progressing. Along with this, the diameter of the imaging lens is made larger and therefore increase in the weight of the imaging lens particularly has been becoming a large burden for the actuator.

Various examples have been disclosed as camera modules having both the OIS function and the AF function. For example, in Japanese Patent Laid-open No. 2011-65140, an example is disclosed in which an imaging lens is driven for AF and the whole of an AF actuator is driven for OIS. Furthermore, in Japanese Patent Laid-open No. 2012-37549, an example is disclosed in which an imaging lens is driven for OIS and the whole of an OIS actuator is driven for AF. In addition, in Japanese Patent Laid-open No. 2014-48533, an example in which an imaging lens is fixed and an image sensor is driven for AF is disclosed.

SUMMARY

Problem 1.

As a camera module described in Japanese Patent Laid-open No. 2011-65140, a camera module is disclosed in which the imaging lens is driven for AF while being supported by a spring and the whole of the AF actuator is driven for OIS while being supported by a suspension wire. When the diameter of the imaging lens is made larger along with increase in the number of pixels, the weight as the movable part increases, of course, and the size of the AF actuator also becomes larger. Therefore, particularly for an OIS actuator, increase in the weight of the imaging lens and increase in the weight of the AF actuator doubly become a burden and a large force becomes necessary for the driving. Moreover, the strength of the suspension wire needs to be enhanced in order to prevent breakage of the suspension wire due to the shock of a drop or other shock. Due to this, the reaction force of the suspension wire as a spring also becomes large and a large force for driving against the reaction force also becomes necessary. Therefore, even if the weight of the imaging lens is at such a level as to allow AF driving, the situation in which OIS driving is very difficult is caused.

As a camera module described in Japanese Patent Laid-open No. 2012-37549, a camera module is disclosed in which the imaging lens is driven for OIS while being supported by a suspension wire and the whole of the OIS actuator is driven for AF while being supported by a spring. When the diameter of the imaging lens is made larger along with increase in the number of pixels, the weight as the movable part increases, of course, and the size of the OIS actuator also becomes larger. Therefore, particularly for an AF actuator, increase in the weight of the imaging lens and increase in the weight of the OIS actuator doubly become a burden and a large force becomes necessary for the driving. Compared with operation of OIS, high-speed motion is made less frequently in operation of AF and a certain level of error can also be permitted in the range of the depth of focus. Therefore, it is desirable to give priority to reduction in the weight of the OIS movable part as in Japanese Patent Laid-open No. 2012-37549. Nonetheless, the burden of the weight increase will eventually reach the limit for the AF actuator and thus a countermeasure becomes necessary.

As a camera module described in Japanese Patent Laid-open No. 2014-48533, a camera module is disclosed in which the imaging lens is fixed and the image sensor is driven for AF. In this example, only AF operation by driving the image sensor is described and OIS operation is not mentioned. The imaging lens is fixed and does not contribute to the OIS operation.

Problem 2.

As one example of a camera module that drives an image sensor, a camera module in which an actuator for AF and the whole of an image sensor are driven for OIS is disclosed in Japanese Patent Laid-open No. 2011-232707. Furthermore, in Japanese Patent Laid-open No. 2014-127766, an example is disclosed in which an image sensor that is a movable part and a terminal wiring board that is a fixed part are connected through wiring by bonding wires and the image sensor is moved for adjustment.

In the camera module described in Japanese Patent Laid-open No. 2011-232707, an imaging lens is driven for AF whereas the actuator for AF and the whole of the image sensor are driven for OIS. The image sensor is a movable part of the OIS. Therefore, to energize the image sensor, an energizing section that makes a bridge between the movable part and the fixed part is necessary. As a measure for this purpose, a flexible wiring board is used in Japanese Patent Laid-open No. 2011-232707. However, the flexible wiring board has a structure in which base film, copper foil, cover lay, and so forth are stacked and it is unavoidable that the flexible wiring board has a certain level of springiness. In Japanese Patent Laid-open No. 2011-232707, in order to reduce the influence of the springiness as much as possible, the flexible wiring board is given a pattern having a U-shape part or L-shape part and is configured to be easily deformed. However, a space for laying the flexible wiring board with the complex pattern structure becomes necessary and the size of the camera module becomes larger. Furthermore, the flexible wiring board has a planar structure. Therefore, the flexible wiring board easily bends in its thickness direction but is necessarily hard in the directions perpendicular to the thickness direction, and the influence of springiness readily arises in these directions. Thus, the flexible wiring board is unsuitable for the purpose of driving the image sensor in the directions perpendicular to the optical axis. When the flexible wiring board is used while having unnecessary springiness, large thrust against the springiness is necessary to deform it, which leads to increase in the power consumption. Moreover, the unnecessary springiness involves a risk of causing unexpected resonance and a possibility of lowering of the control performance arises.

In Japanese Patent Laid-open No. 2014-127766, a package structure having a mechanism for position adjustment of the image sensor is disclosed, and a die that is a movable part and the terminal wiring board that is a fixed part are connected through wiring by plural bonding wires having flexibility. However, they are structures in the package of the image sensor and are the position adjustment mechanism. Thus, they are bonded and fixed by a resin after the adjustment. Therefore, it is difficult to apply this configuration, as it is, to a camera module that carries out control in the state in which the image sensor is typically capable of displacement for AF and OIS.

1.

One aspect of the present disclosure is made in view of such circumstances, and it is desirable to provide a camera module that can implement both AF operation and OIS operation even when the diameter of an imaging lens is made larger.

2.

Another aspect of the present disclosure is made in view of such circumstances, it is desirable to provide a camera module that can implement AF operation and OIS operation in such a manner that the influence of springiness due to an energizing section for an image sensor is avoided as much as possible and the image sensor is driven by smaller thrust when the need to drive the image sensor arises in the case in which the diameter of an imaging lens is made larger, or other cases.

1.

A mode of the present disclosure relates to a camera module. The camera module is a camera module including an imaging lens supported in such a manner as to be displaceable in a predetermined direction, an image sensor supported in such a manner as to be displaceable in another predetermined direction different from the predetermined direction, and actuators for driving each of the imaging lens and the image sensor. Autofocus operation is carried out by one actuator and optical image stabilization operation is carried out by the other actuator.

According to this mode, it is possible to avoid a double structure in which the whole of one actuator in the actuator for autofocus and the actuator for optical image stabilization is driven by the other actuator. Therefore, even when the diameter of the imaging lens is made larger, reduction in the weight of a movable part can be intended and it becomes possible to implement both AF operation and OIS operation with predetermined performance.

Furthermore, the respective actuators may include an actuator that drives the imaging lens in a direction perpendicular to the optical axis of the imaging lens and an actuator that drives the image sensor in the optical axis direction of the imaging lens.

Moreover, the respective actuators may include an actuator that drives the imaging lens in the optical axis direction of the imaging lens and an actuator that drives the image sensor in a direction perpendicular to the optical axis of the imaging lens.

Which of the actuator of the imaging lens and the actuator of the image sensor is used for autofocus and which of them is used for optical image stabilization may be comprehensively determined from whether the weight of the movable part is heavier or lighter, the magnitude of tension due to a flexible printed board (FPC) for energization, and so forth. As described above, control with higher speed and higher precision is required for the optical image stabilization. Therefore, employing the actuator about which the weight of the movable part can be set lighter as the actuator for the optical image stabilization becomes a dominant choice. Alternatively, if the weights of the movable part are at an equivalent level, because an FPC having a large number of energizing sections is necessary for energization of the image sensor, the actuator of the image sensor may be used for AF so that the influence of tension due to the FPC may be kept from being given to the optical image stabilization.

Furthermore, at least one of the respective actuators may have an electromagnetic drive section.

Moreover, both of the respective actuators may have an electromagnetic drive section.

As drive sections of the actuator, a method of using a piezoelectric element, a method of using a shape memory alloy (SMA), and so forth have also been proposed. These drive sections can yield high power and therefore it is also possible to use them for an object of the present application. On the other hand, a problem of operation sound exists in the piezoelectric driving, and the SMA involves problems such as a problem that the displacement speed becomes low at the time of cooling. In contrast, the electromagnetic drive section is free from these problems. Because intending reduction in the weight of the movable part so that driving can be carried out even when the power is low is an object of the present application, using the electromagnetic drive section is preferable and larger effects can be expected.

Furthermore, at least one of the respective actuators may support a movable part by an elastic body.

Moreover, both of the respective actuators may support a movable part by an elastic body.

As support sections of the movable part in the actuator, a ball guide structure, a shaft guide structure, and so forth have also been proposed. They have also merits such as robustness against the shock of a drop and therefore it is also possible to use them for an object of the present application. On the other hand, there is also a problem that operation becomes non-linear due to the influence of friction of a contact part and minute displacement becomes difficult, and so forth. In contrast, when the movable part is supported by an elastic body, the influence of friction can be avoided. Therefore, using the elastic body is more preferable. In particular, in the case of using the electromagnetic drive section, it is also envisaged that it is difficult to output power sufficient to overcome friction and therefore it is desirable to employ elastic body supporting free from friction.

Furthermore, the actuator that carries out the optical image stabilization operation may include a position detecting section configured to detect displacement of a movable part.

This enables the optical image stabilization operation with higher accuracy. In particular, in the case of using magnetism as the position detecting section, there is an advantage that a magnetic field generating section can be made common between position detection and driving, and so forth, and the position detecting section has good compatibility with the electromagnetic drive section.

Note that what are obtained by mutually replacing optional combinations of the above constituent elements or constituent elements or expressions of the present disclosure among method, device, system, and so forth are also effective as modes of the present disclosure.

Moreover, this description of the section to solve the problems does not explain all indispensable characteristics and therefore sub-combinations of these characteristics described can also be the present disclosure.

According to the present disclosure, both AF operation and OIS operation can be implemented even when the diameter of an imaging lens is made larger.

DETAILED DESCRIPTION OF THE PREFERRED EMBODIMENTS

Figure 1:
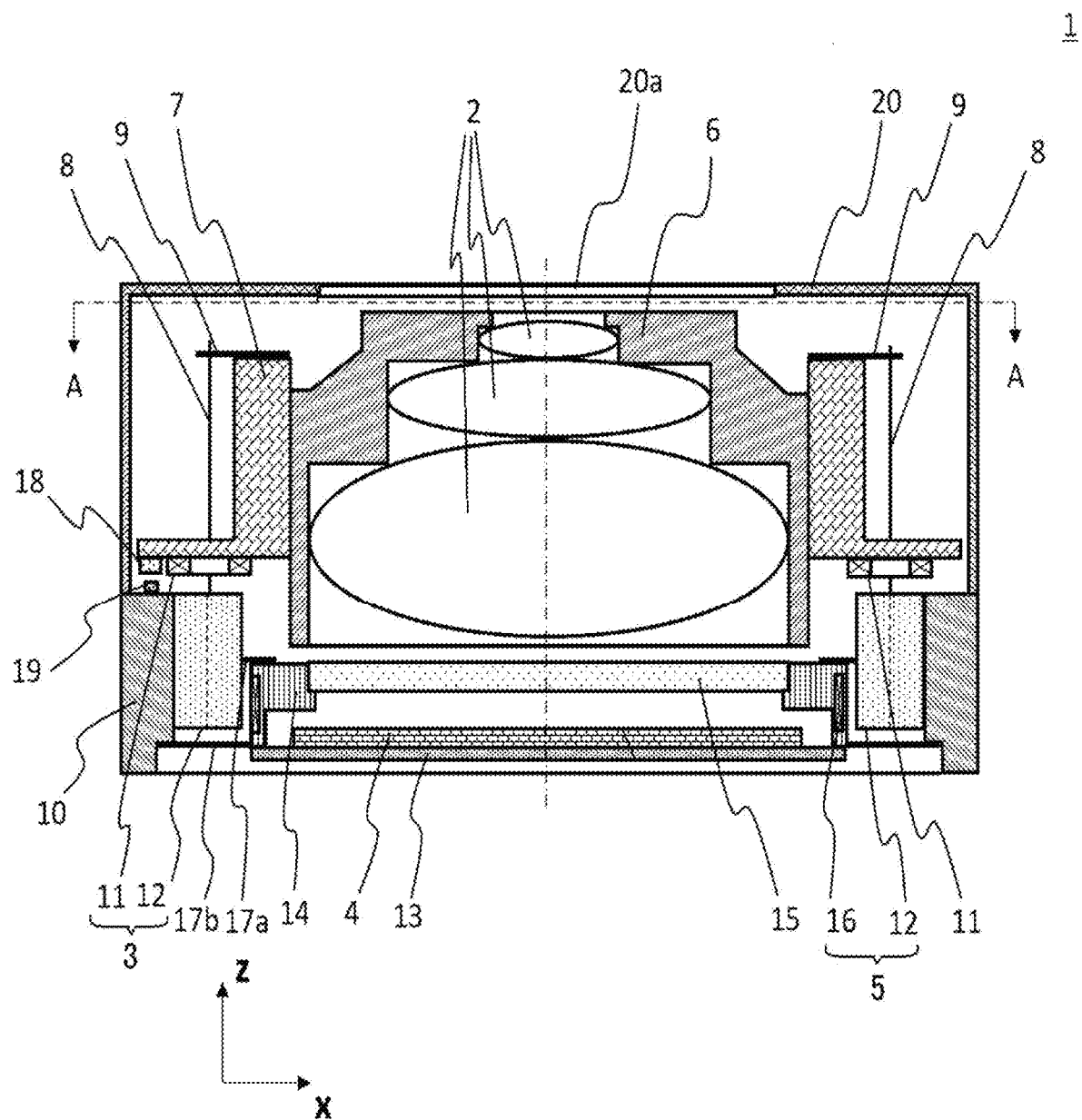
FIG. 1 is a central sectional view illustrating a schematic configuration of a camera module according to an embodiment example 1-1 of a first embodiment.

The present disclosure will be described below based on preferred embodiments with reference to the drawings. Regarding each embodiment, the same or equivalent constituent element, component, and processing illustrated in the drawings are given the same numeral and overlapping description is omitted as appropriate. Furthermore, the embodiments are not what limit the disclosure but exemplification, and all characteristics described in the embodiments and combinations thereof are not necessarily essential matters of the disclosure.

Moreover, dimensions (thickness, length, width, and so forth) of the respective components described in the drawings are scaled as appropriate for facilitation of understanding in some cases. In addition, dimensions of plural components do not necessarily represent the magnitude relation between them. Even when certain component A is depicted thicker than another component B on a drawing, component A is thinner than component B possibly.

In the present specification, "the state in which component A is connected to component B" includes, besides the case in which component A and component B are directly connected physically, also the case in which component A and component B are indirectly connected with the intermediary of another component that does not have a substantial influence on the electrical connection state of them or does not impair functions and effects provided due to the coupling of them.

Similarly, "the state in which component C is disposed between component A and component B" includes, besides the case in which component A and component C or component B and component C are directly connected, also the case in which component A and component C or component B and component C are indirectly connected with the intermediary of another component that does not have a substantial influence on the electrical connection state of them or does not impair functions and effects provided due to the coupling of them.

First Embodiment

Embodiment Example 1-1

Figure 2:
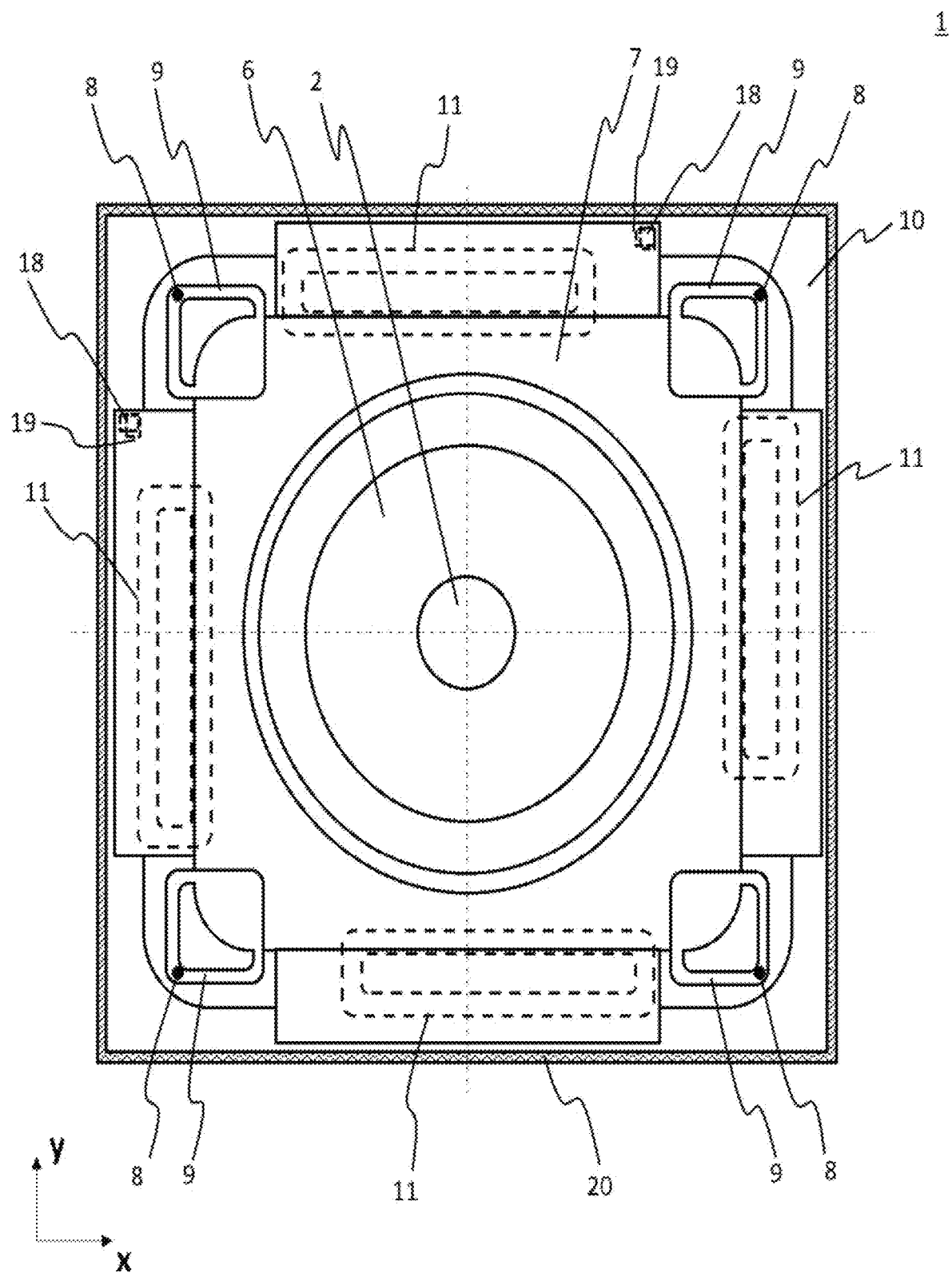
FIG. 2 is a plan view of an inside of the camera module of FIG. 1.

FIG. 1 is a central sectional view illustrating a schematic configuration of a camera module 1 according to an embodiment example 1-1 of the present disclosure. FIG. 2 is a plan view of an inside of the camera module 1 of FIG. 1. The embodiment example 1-1 will be described by using FIG. 1 and FIG. 2.

The camera module 1 is incorporated in a digital camera, a digital a video camera, a smartphone, or a tablet terminal and is used for a picture or a video photographing. The camera module 1 is a component obtained by integrating an image sensor and lenses and therefore the structure thereof is fundamentally different from the lens-exchangeable camera. The camera module 1 has an AF function and an OIS function.

In the present embodiment, description will be made with a configuration in which a position detecting element is disposed for OIS. However, the position detecting element may be absent. Although description will be made with a configuration in which a position detecting element is not disposed for AF, a configuration in which a position detecting element is disposed may be employed. The Hall element is widely used as the position detecting element for use for the camera module and therefore the position detecting element will be described as a Hall element. However, the position detecting element is not limited thereto and may be a magnetoresistive element such as a magnetic resistance (MR) element or a giant magnetoresistance (GMR) element.

The camera module 1 includes a first actuator 3 for positioning imaging lenses 2 in a first direction and a second actuator 5 for positioning an image sensor 4 in a second direction different from the first direction. In the embodiment example 1-1, the first direction is a direction perpendicular to the optical axis of the imaging lenses 2 and the OIS function is provided by the first actuator 3. Furthermore, the second direction is the optical axis direction of the imaging lenses 2 and the AF function is provided by the second actuator 5. Hereinafter, the first actuator 3 and the second actuator 5 are referred to as the OIS actuator 3 and the AF actuator 5, respectively. In general, OIS is what corrects both of blurs in the vertical direction and the horizontal direction. Therefore, the term "first direction" here is a generic term of X direction and Y direction and the OIS actuator 3 can position the imaging lenses 2 in the X direction and the Y direction independently. Note that the OIS actuator 3 does not position only the imaging lenses 2 and positions an OIS movable part including the imaging lenses 2, a lens barrel 6, a lens holder 7, and so forth.

The imaging lenses 2 are housed in the lens barrel 6. Although being represented as three lenses in the diagram, the imaging lenses 2 may be four or more lenses or may be two or less lenses. The lens barrel 6 is positioned and mounted in the lens holder 7. The lens holder 7 is supported by four suspension wires 8 movably in the first direction (X-axis direction and Y-axis direction in the diagram) perpendicular to the optical axis. The suspension wires 8 are not directly connected to the lens holder 7 and the upper ends of the suspension wires 8 are connected through shock absorbing springs 9. The shock absorbing springs 9 are components for absorbing shock in the longitudinal direction of the suspension wire 8. The suspension wire 8 has a small permissible amount of expansion and contraction in the longitudinal direction and easily breaks due to the shock of a drop or other shock. Therefore, the shock absorbing spring 9 bends instead of expansion and contraction of the suspension wire 8 and prevents the breakage of the suspension wire 8. The lower ends of the suspension wires 8 are connected to a base 10 that is a fixed part. When being used for energization, the suspension wires 8 may be connected to a flexible printed board (not illustrated) stuck to the base 10. In such a case, the upper ends and lower ends of the suspension wires 8 may be fixed to the shock absorbing springs 9 and the flexible printed board, respectively, by solder.

The OIS actuator 3 mainly includes OIS coils 11 and magnets 12 for driving. The OIS coils 11 are fixed to the lower surface of the lens holder 7 and are driven by an actuator driver that is not illustrated in the diagram to generate magnetic flux according to a drive current. The magnets 12 for driving are fixed to the base 10 in such a manner as to be opposed to the OIS coils 11. Magnetic flux from the magnet 12 for driving acts on the OIS coil 11 and a Lorentz force is generated through energizing the OIS coil 11, so that an OIS movable part composed of the imaging lenses 2, the lens barrel 6, the lens holder 7, the OIS coils 11, and so forth is positioned in the directions perpendicular to the optical axis.

The image sensor 4 is mounted on a module substrate 13 and is covered by a sensor cover 14. An opening exists at a central part of the sensor cover 14 and the opening is closed by an infrared radiation (IR) cut glass 15. An AF coil 16 is wound around a side surface of the sensor cover 14. The sensor cover 14 is supported by upper and lower AF springs 17a and 17b movably in the optical axis direction (Z-axis direction in the diagram) relative to the fixed part (base 10).

The AF actuator 5 mainly includes the AF coil 16 and the magnets 12 for driving. The magnets 12 for driving are disposed opposed to the AF coil 16. The AF coil 16 is driven by an actuator driver that is not illustrated in the diagram. The magnet 12 for driving is used also as the magnet 12 for OIS driving. By sharing a common magnet for OIS and for AF as above, the number of components can be reduced. The magnetic flux from the magnet 12 for driving acts on the AF coil 16 and a Lorentz force is generated through energizing the AF coil 16, so that an AF movable part composed of the image sensor 4, the module substrate 13, the sensor cover 14, the IR cut glass 15, the AF coil 16, and so forth is driven in the optical axis direction. Note that, for energizing the AF coil 16 existing in the AF movable part, either or both of the upper and lower AF springs 17a and 17b may be used as a conductor. Furthermore, for energizing the image sensor 4 existing in the AF movable part, a large number of energizing sections are necessary and therefore a flexible printed board (not illustrated) extended from the module substrate 13 may be used. At this time, it is desirable to use the flexible printed board of as soft a material as possible in order to reduce the influence of springiness of the flexible printed board as much as possible. Note that the flexible printed board is disposed in a plane perpendicular to the optical axis and therefore easily bends in the optical axis direction. However, the springiness thereof readily becomes strong against deformation in the direction perpendicular to the optical axis. It is desirable to use the actuator of the image sensor as the actuator for AF for disposing the flexible printed board with space saving.

In the embodiment example 1-1, a position detecting section relating to the first direction (X direction and Y direction) of the imaging lenses 2, i.e. a position detecting section for OIS, is disposed in the camera module 1. By detecting the position of the imaging lenses 2 and feeding back the position to use it for position control, the accuracy of positioning to a target position can be enhanced and the imaging lenses 2 can be held at a predetermined position even when disturbance vibration is received. The position detecting section for OIS is composed of a magnet 18 for position detection mounted on the OIS movable part (lens holder 7) and a Hall element 19 disposed on the fixed part (base 10) in such a manner as to be opposed to the magnet 18 for position detection. When the magnet 18 for position detection is displaced due to OIS driving, the magnitude of the density of magnetic flux incident on the Hall element 19 changes and is output as a position detection signal. In order to reduce the influence of magnetic flux from the magnet 12 for driving and the OIS coil 11, the Hall element 19 is disposed at a position somewhat separate from them (see FIG. 2). The Hall element 19 and terminals of the OIS coils 11 connected via the suspension wires 8 and so forth are connected to an actuator driver that is not illustrated in the diagram. The Hall element 19 may be incorporated in the actuator driver. The actuator driver is a functional integrated circuit (IC) integrated on one semiconductor substrate. Note that the position detecting section for OIS illustrated in FIG. 1 is a position detecting section of the X-axis direction and a position detecting section for the Y-axis direction similarly exists in a direction shifted by 90 degrees (see FIG. 2).

The whole of the camera module 1 is covered by a cover 20. An opening 20a is made at the center of the cover 20 and serves as a path through which light is incident on the imaging lenses 2. The cover 20 has also a role as a stopper for mechanically restricting the movable range as the actuator and therefore it is desirable that the cover 20 is a metal. Furthermore, in the case in which a magnet is mounted on the movable part, it is desirable that the cover 20 is a non-magnetic material. When the cover 20 is a magnetic body, the magnet is attracted by the cover 20 and the movable part is displaced. To restore this, an extra current becomes necessary.

Figure 3:
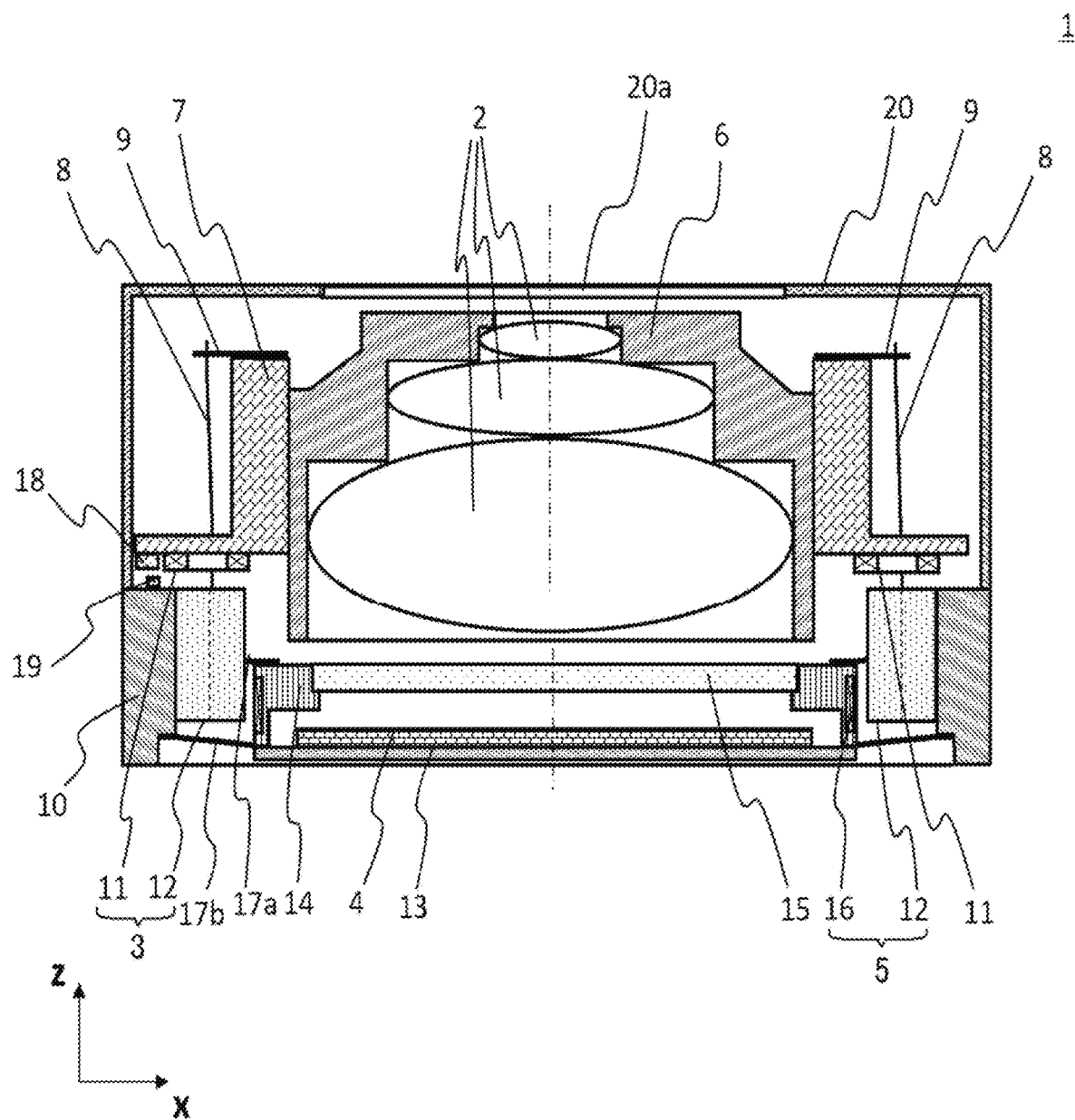
FIG. 3 is a sectional view illustrating a state in which imaging lenses are displaced due to OIS operation and an image sensor is displaced due to AF operation in the camera module of FIG. 1.

Next, the state in which the movable parts of OIS and AF are displaced will be described. FIG. 3 is a sectional view illustrating the state in which the imaging lenses are displaced due to OIS operation and the image sensor is displaced due to AF operation in the camera module 1 of FIG. 1.

FIG. 3 illustrates the state in which the OIS movable part including the imaging lenses 2 is displaced to the left end in the diagram, and the suspension wires 8 are deformed to support the OIS movable part. The left end of the lens holder 7 abuts against the cover 20 and the cover 20 plays a role as a mechanical stopper that determines the movable range of the OIS. The magnet 18 for position detection is mounted on the lens holder 7. As is clear also from the diagram, the magnet 18 for position detection gets very close to the cover 20 in the state in which the lens holder 7 abuts against the cover 20. Therefore, it is desirable that the material of the cover is non-magnetic. In the state in which displacement is caused as above, the relative position between the magnet 18 for position detection and the Hall element 19 changes and therefore the displacement can be detected. Meanwhile, FIG. 3 illustrates the state in which the AF movable part including the image sensor 4 is displaced in the downward direction, and the upper and lower AF springs 17a and 17b are deformed to support the AF movable part. Although not illustrated in the diagram, a back lid may be disposed to be used as a mechanical stopper so that the module substrate 13 and so forth may be kept from protruding from the lower surface of the base 10 even when the AF movable part is displaced in the downward direction in the diagram.

Figure 4:
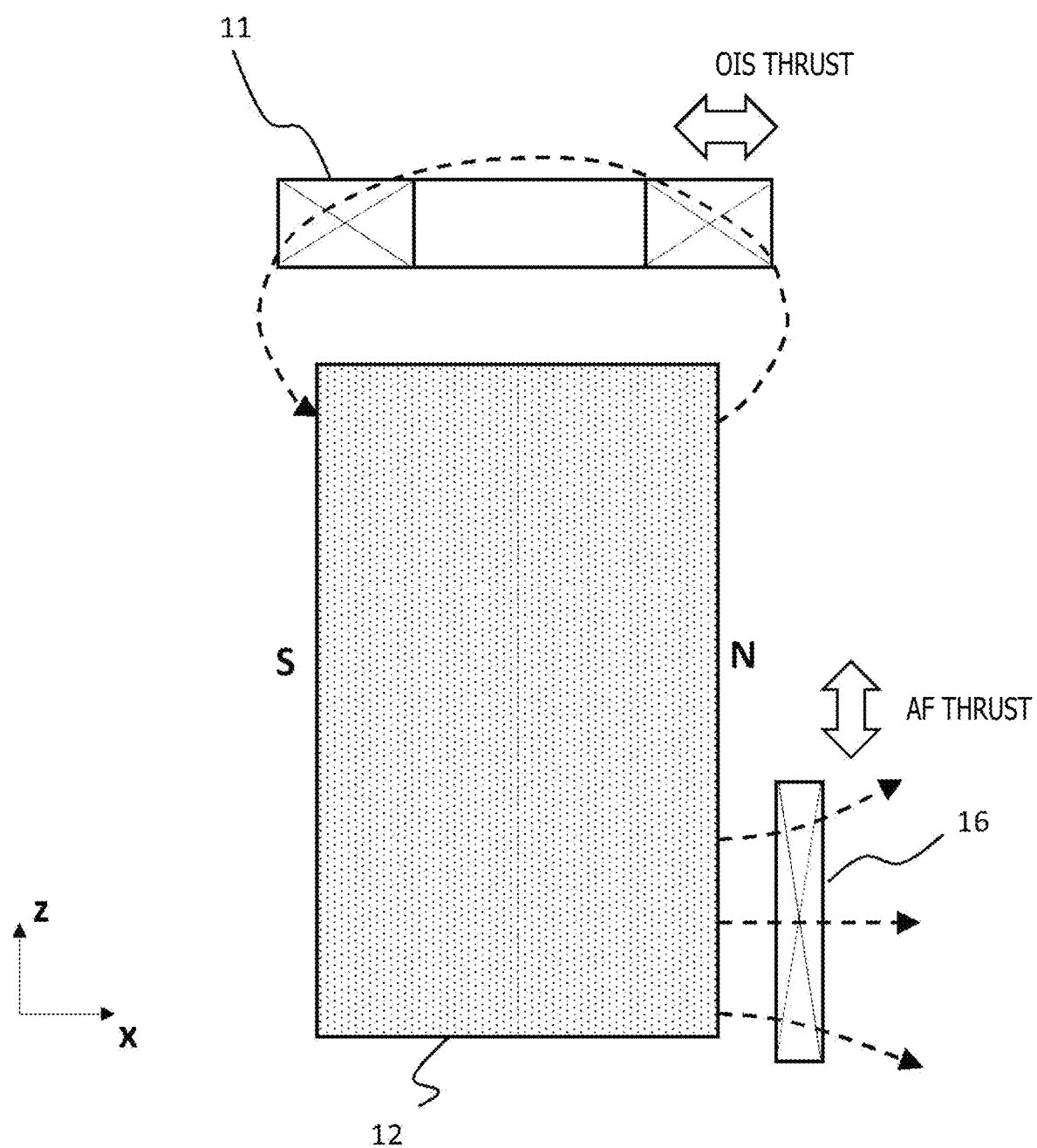
FIG. 4 is a diagram in which the part of a magnet for driving and coils is enlarged in the camera module of FIG. 1 and is a diagram illustrating schematic directions of magnetic flux incident on the coil parts.

Next, the positional relation between the magnet 12 for driving and the OIS coil 11 and the AF coil 16 will be described by using FIG. 4. FIG. 4 is a diagram in which the part of the magnet for driving and the coils is enlarged in the camera module of FIG. 1 and is a diagram illustrating schematic directions of magnetic flux incident on the coil parts. In FIG. 4, the direction of the magnetic poles is one example and the N pole and the S pole may be reversed.

While magnetic flux coming out from the N pole of the magnet 12 for driving returns to the S pole, the magnetic flux penetrates part of the OIS coil 11. At this time, when the OIS coil 11 is energized, a Lorentz force acts in the direction perpendicular to each of the direction of the magnetic flux and the direction of the current (winding direction of the coil). The magnetic flux is obliquely incident on the OIS coil 11 as illustrated in the diagram. The component of the Z-axis direction in the magnetic flux that penetrates the OIS coil 11 is in opposite directions between the right side and the left side of the coil and the current is also in opposite directions. Therefore, the direction of the Lorentz force is the same between the right side and the left side of the coil, so that OIS thrust in the X-axis direction is yielded. On the other hand, the component of the X-axis direction in the magnetic flux that penetrates the OIS coil 11 is in the same direction between the right side and the left side of the coil and the current is in opposite directions. Therefore, the forces of the right side and the left side cancel out each other.

Furthermore, the magnetic flux coming out from the N pole of the magnet 12 for driving penetrates the AF coil 16. At this time, when the AF coil 16 is energized, a Lorentz force acts in the direction perpendicular to each of the direction of the magnetic flux and the direction of the current (winding direction of the coil). The direction of the magnetic flux is the X-axis direction and the direction of the current is the Y-axis direction. Therefore, AF thrust acts in the Z-axis direction.

Figure 5A:
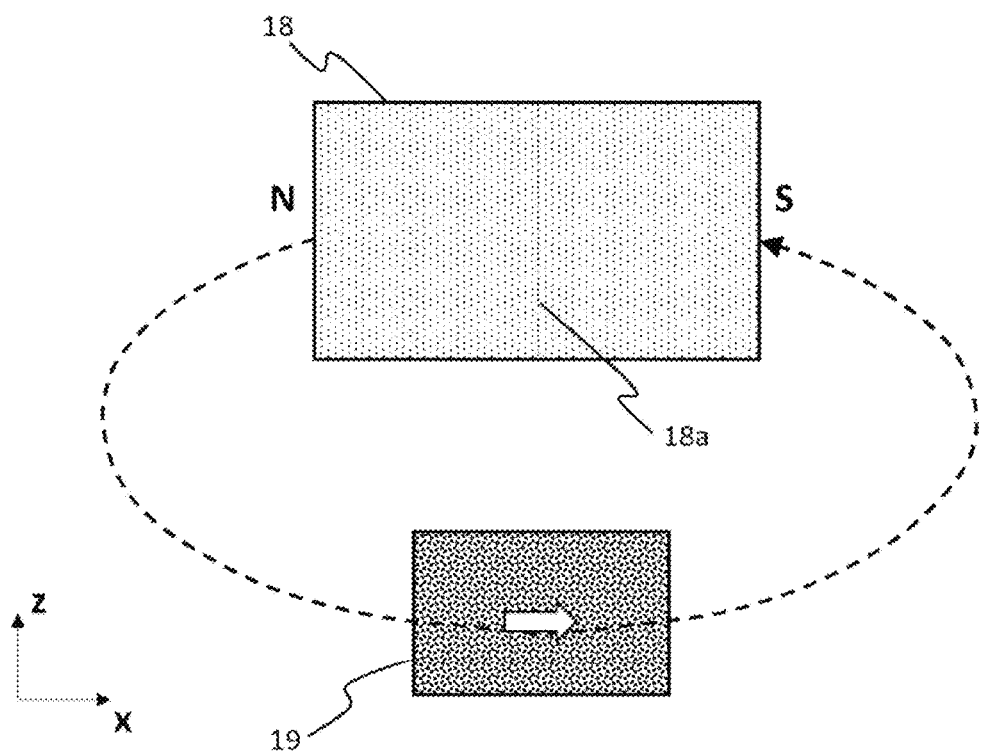
FIGS. 5A and 5B are diagrams illustrating the relation between a magnet for position detection and a Hall element in the camera module of FIG. 1.
Figure 5B:
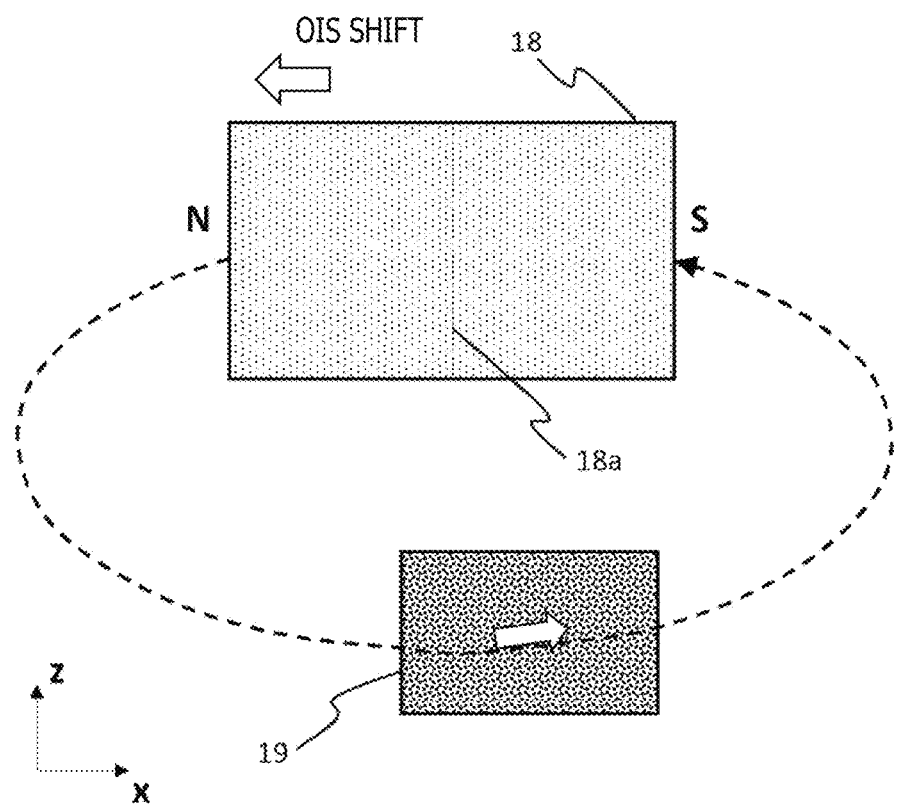

Next, the positional relation between the magnet 18 for position detection and the Hall element 19 will be described by using FIG. 5. FIGS. 5A and 5B are diagrams illustrating the relation between the magnet for position detection and the Hall element in the camera module of FIG. 1. In FIG. 5A, the state in which displacement for OIS is not caused is illustrated. In FIG. 5B, the state in which the imaging lenses 2 are displaced for OIS is illustrated. In FIG. 5, the direction of the magnetic poles is one example and the N pole and the S pole may be reversed.

The Hall element 19 detects the magnetic flux density of the direction perpendicular to the chip surface thereof (in the diagram, Z-axis direction) and the orientation thereof. As in FIG. 5A, when the Hall element 19 exists at a position opposed to a polarization line 18a of the magnet 18 for position detection, the magnetic flux is in the X-axis direction at the position of the Hall element 19 and therefore the magnetic flux density detected by the Hall element 19 is 0. On the other hand, as in FIG. 5B, when the magnet 18 for position detection is shifted in the OIS direction, the magnetic flux incident on the Hall element 19 has a component of the Z-axis direction and a Hall detection signal according to the amount of displacement is obtained.

First Modification Example of Embodiment 1-1

In the embodiment example 1-1 of FIG. 1, the description has been made with the moving coil structure in which the coil is the movable part in both the OIS actuator and the AF actuator. However, the configuration is not limited thereto and a moving magnet structure may be employed. In the case of the moving magnet structure, particularly in the OIS actuator about which position detection is carried out, the magnet for driving can be used also as the magnet for position detection and thus disposing the magnet for position detection separately becomes unnecessary. An example in which the moving magnet structure is employed in the OIS actuator as above will be described by using FIG. 6 as a first modification example of the embodiment example 1-1. FIG.

6 is a central sectional view of a camera module 1A according to the first modification example of the embodiment example 1-1.

Figure 6:
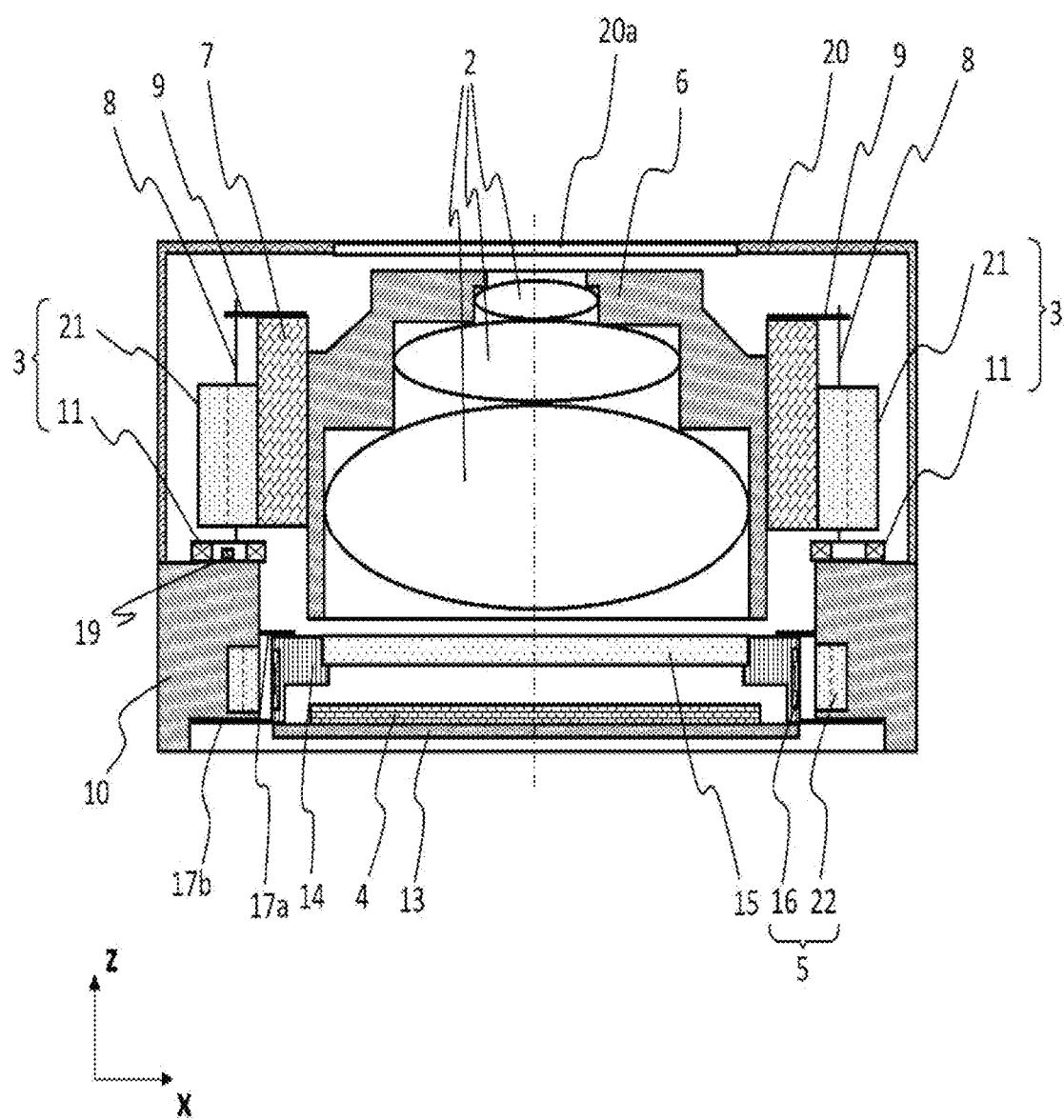
FIG. 6 is a central sectional view of a camera module according to a first modification example of the embodiment example 1-1.

In the modification example of FIG. 6, the magnet for driving is separated into magnets 21 for OIS driving and magnets 22 for AF driving and they are each disposed. The magnets 21 for OIS driving are fixed to the lens holder 7, which provides the moving magnet structure. The OIS coils 11 are disposed on the fixed part (base 10) in such a manner as to be opposed to the magnets 21 for OIS driving. On the other hand, AF is based on a moving coil structure and the magnets 22 for AF driving are fixed to the fixed part (base 10) in such a manner as to be opposed to the AF coil 16 disposed in the AF movable part. In the OIS actuator, only the arrangement of the magnets and the coils is opposite to that in FIG. 1 and the principle of driving and so forth are the same. In the AF actuator, only magnets used exclusively for AF are employed as the magnets for driving and the principle of driving and so forth are the same.

In the modification example of FIG. 6, the magnet 21 for OIS driving doubles as a magnet for OIS position detection and the Hall element 19 is disposed on the fixed part (base 10) in such a manner as to be opposed to the magnet 21 for OIS driving. Because the OIS coil 11 and the Hall element 19 are both disposed opposed to the magnet 21 for OIS driving, the Hall element 19 is disposed at the center of the winding of the OIS coil 11 so that the OIS coil 11 and the Hall element 19 may be kept from physically interfering with each other. In such a configuration, a magnetic field radiated when the OIS coil 11 is energized is incident on the Hall element 19 and becomes noise for the Hall element 19. This noise may be electrically corrected according to need. Alternatively, the Hall element 19 may be disposed outside the winding of the OIS coil 11 in order to reduce incidence of noise on the Hall element 19.

Terminals of the OIS coils 11 and the Hall element 19 are connected to an actuator driver that is not illustrated in the diagram. In this example, an energizing section from the movable part to the fixed part is unnecessary because the OIS coils 11 are also disposed on the fixed part side. Note that the Hall element 19 may be an actuator driver in which a Hall element is incorporated.

Second Modification Example of Embodiment Example 1-1

Figure 7:
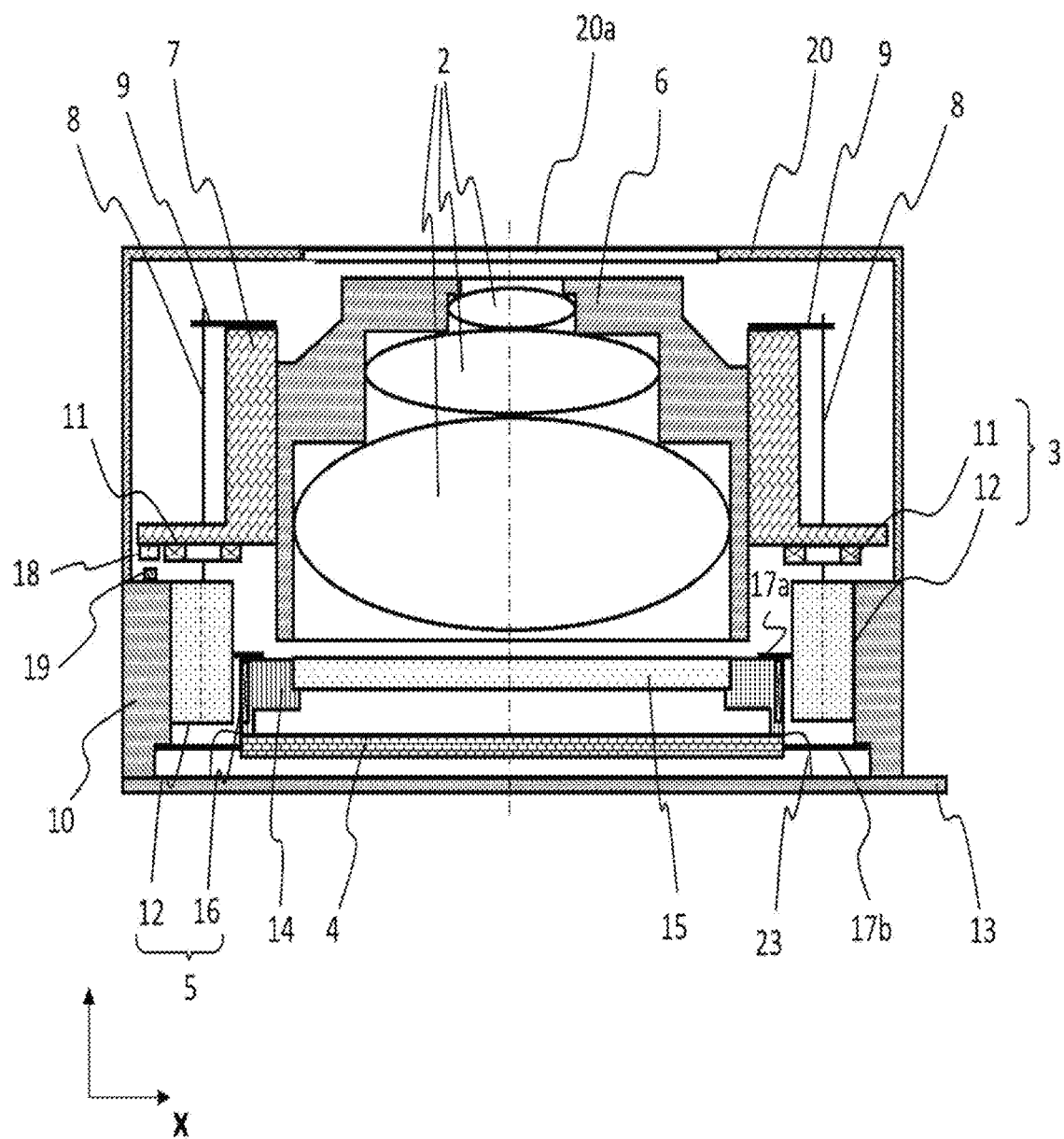
FIG. 7 is a central sectional view of a camera module according to a second modification example of the embodiment example 1-1.

In the embodiment example 1-1 of FIG. 1, it has been explained that a large number of energizing sections are necessary for energizing the image sensor 4 existing in the AF movable part and therefore the flexible printed board (not illustrated) extended from the module substrate 13 is used. However, the configuration is not limited thereto. An example in which bonding wires are used as energizing sections will be described by using FIG. 7 as a second modification example of the embodiment example 1-1. FIG. 7 is a central sectional view of a camera module 1B according to the second modification example of the embodiment example 1-1.

In FIG. 7, the module substrate 13 and a flexible printed board extended from it are disposed in the fixed part and bonding wires 23 are used to electrically connect the image sensor 4 existing in the AF movable part and the module substrate 13. The number of bonding wires 23 is large. However, the springiness of each one bonding wire 23 is very weak and the influence of the springiness of the bonding wires 23 on the motion of the movable part is very small.

Note that it has been explained that it is desirable to use the actuator of the image sensor as the actuator for AF in the case of using the flexible printed board disposed in the movable part as a flexible printed board for energization. However, in the case of using bonding wires as energizing sections between the movable part and the fixed part as in the second modification example, the difference in the springiness depending on the direction is small and the actuator of the image sensor may be used as either the actuator for AF or the actuator for OIS.

Embodiment Example 1-2

Figure 8:
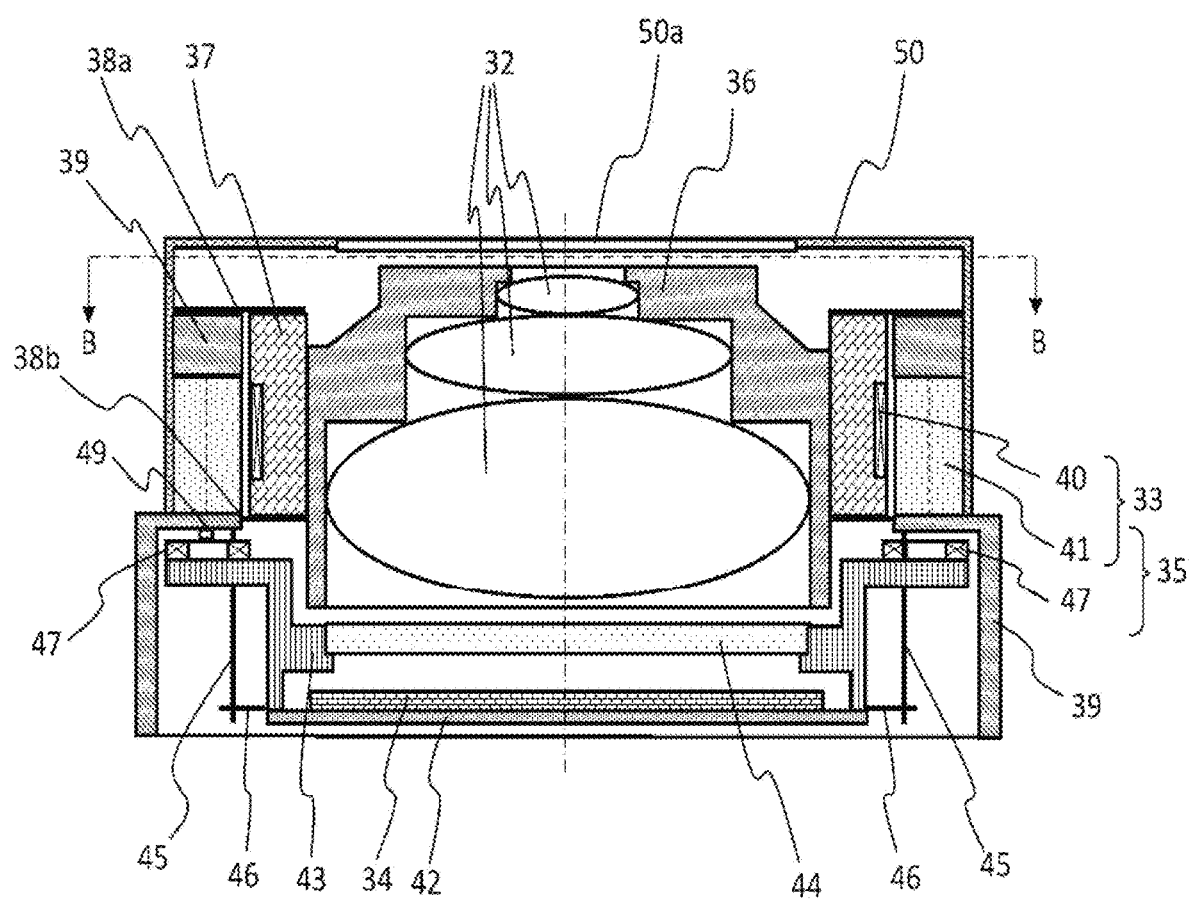
FIG. 8 is a central sectional view illustrating the schematic configuration of a camera module according to embodiment example 1-2 of the first embodiment.
Figure 9:
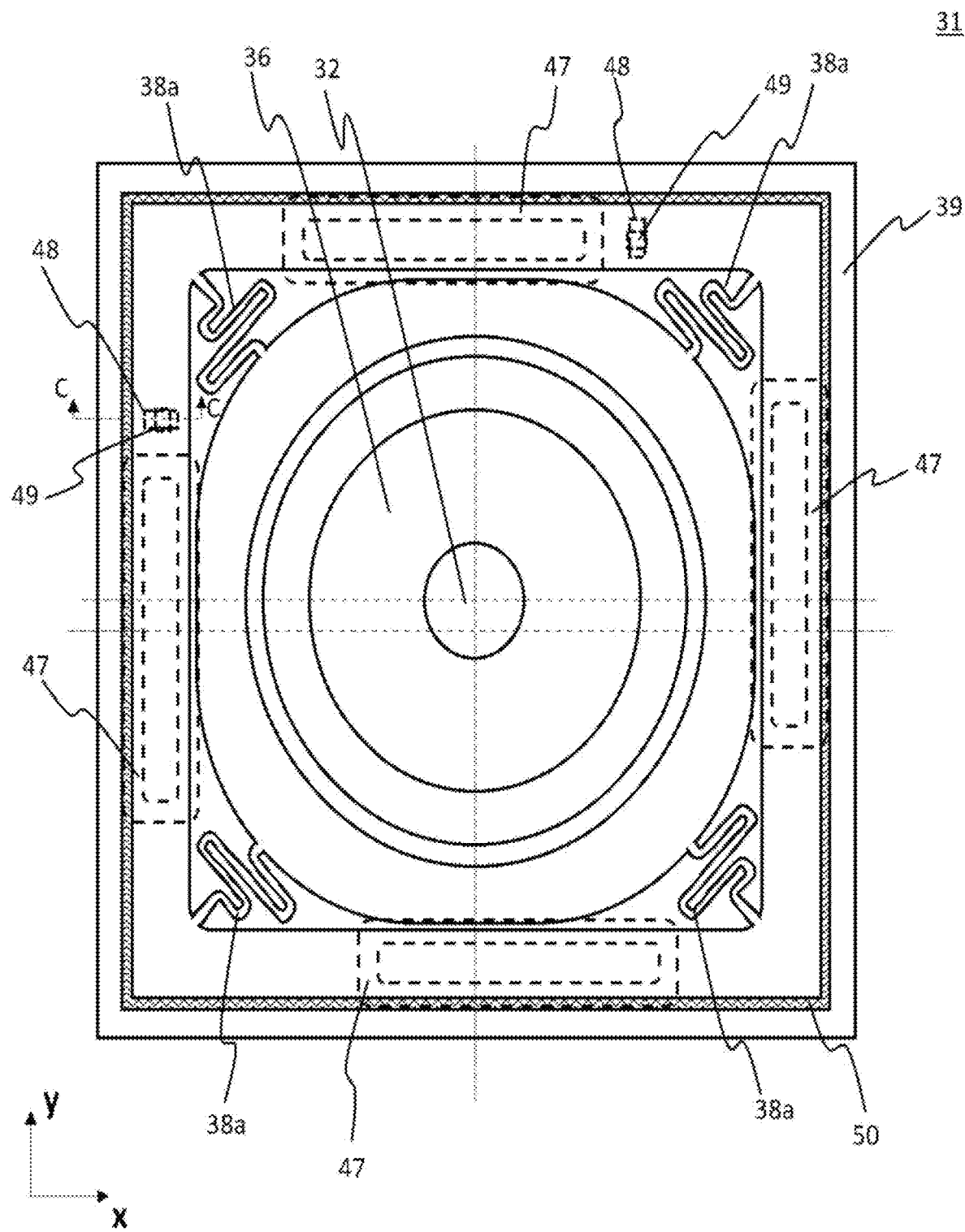
FIG. 9 is a B-B sectional view of the camera module of FIG. 8.
Figure 10:
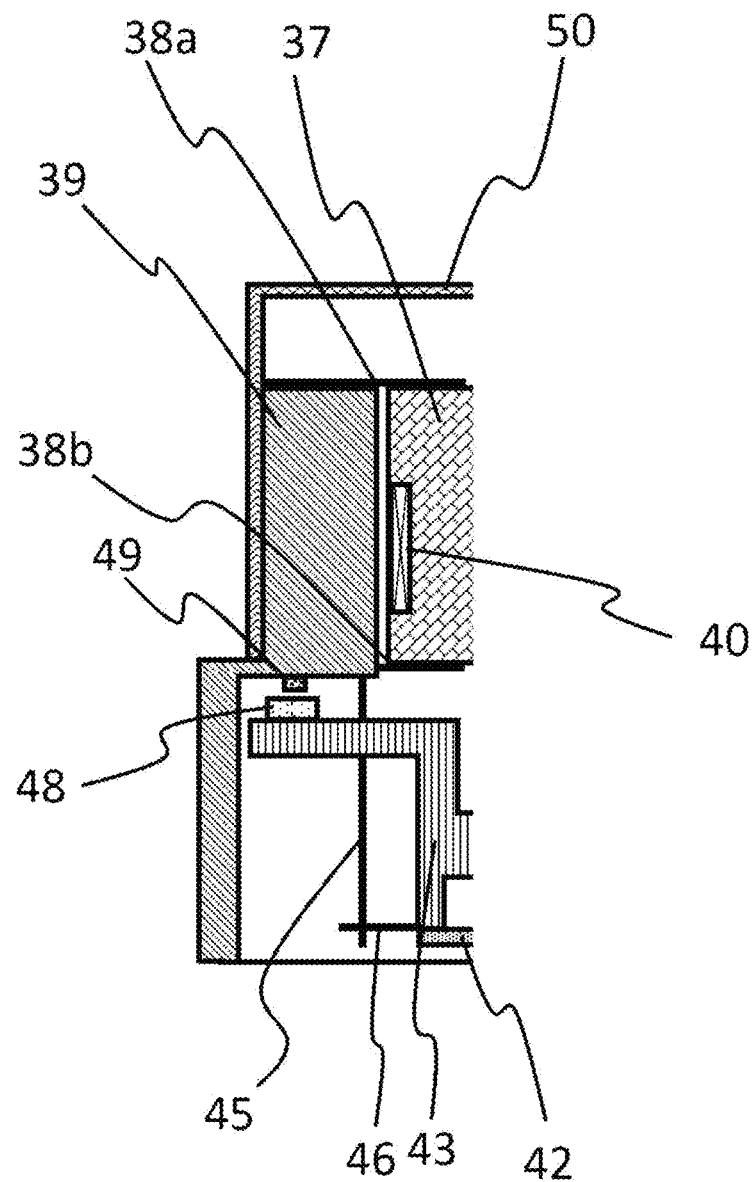
FIG. 10 is a C-C main part sectional view of the camera module of FIG. 9.

FIG. 8 is a central sectional view of a camera module 31 according to an embodiment example 1-2 of a first embodiment. FIG. 9 is a B-B sectional view of the camera module 31 of FIG. 8. FIG. 10 is a C-C main part sectional view of the camera module 31 of FIG. 9. The embodiment example 1-2 will be described by using FIG. 8, FIG. 9, and FIG. 10.

The camera module 31 includes a first actuator 33 that positions imaging lenses 32 in the optical axis direction and a second actuator 35 that positions an image sensor 34 in the direction perpendicular to the optical axis. In the embodiment example 1-2, an AF function is provided by the first actuator 33 and an OIS function is provided by the second actuator 35. Hereinafter, the first actuator 33 is referred to as the AF actuator and the second actuator 35 is referred to as the OIS actuator.

The imaging lenses 32 are housed in a lens barrel 36. Although being represented as three lenses in the diagram, the imaging lenses 32 may be four or more lenses or may be two or less lenses. The lens barrel 36 is positioned and mounted in a lens holder 37. The lens holder 37 is supported by upper and lower two AF springs 38a and 38b movably in the optical axis direction (Z-axis direction in the diagram) relative to a base 39.

The AF actuator 33 mainly includes an AF coil 40 and magnets 41 for driving. The AF coil 40 is wound around the side surface of the lens holder 37. The AF coil 40 is driven by an actuator driver that is not illustrated in the diagram. The magnets 41 for driving are disposed opposed to the AF coil 40. Magnetic flux from the magnet 41 for driving acts on the AF coil 40 and a Lorentz force is generated through energizing the AF coil 40, so that an AF movable part composed of the imaging lenses 32, the lens barrel 36, the lens holder 37, the AF coil 40, and so forth is driven in the optical axis direction. Note that, for energizing the AF coil 40 existing in the AF movable part, either or both of the upper and lower AF springs 38a and 38b may be used.

The image sensor 34 is mounted on a module substrate 42 and is covered by a sensor cover 43. An opening exists at a central part of the sensor cover 43 and the opening is closed by an IR cut glass 44. The sensor cover 43 is supported by four suspension wires 45 movably in the directions (X-axis direction and Y-axis direction in the diagram) perpendicular to the optical axis relative to a fixed part (base 39). The suspension wires 45 are not directly connected to the sensor cover 43 and the lower ends of the suspension wires 45 are connected through shock absorbing springs 46. The shock absorbing springs 46 are components for absorbing shock in the longitudinal direction of the suspension wire 45. The suspension wire 45 has a small permissible amount of expansion and contraction in the longitudinal direction and easily breaks due to the shock of a drop or other shock. Therefore, the shock absorbing spring 46 bends instead of expansion and contraction of the suspension wire 45 and prevents the breakage of the suspension wire 45. The upper ends of the suspension wires 45 are connected to the base 39, which is the fixed part. When being used for energization, the suspension wires 45 may be connected to a flexible printed board (not illustrated) stuck to the base 39. In such a case, the lower ends and upper ends of the suspension wires 45 may be fixed to the shock absorbing springs 46 and the flexible printed board, respectively, by solder.

The OIS actuator 35 mainly includes OIS coils 47 and the magnets 41 for driving. The OIS coils 47 are fixed to the upper surface of the sensor cover 43. The magnet 41 for driving is fixed to the base 39 in such a manner as to be opposed to the OIS coil 47. The magnet 41 for driving is used both as the magnet for OIS driving and as the magnet for AF driving. By sharing a common magnet for OIS and for AF as above, the number of components can be reduced. The magnetic flux from the magnet 41 for driving acts on the OIS coil 47 and a Lorentz force is generated through energizing the OIS coil 47, so that an OIS movable part composed of the image sensor 34, the module substrate 42, the sensor cover 43, the IR cut glass 44, the OIS coils 47, and so forth is driven in the directions perpendicular to the optical axis. For energizing the OIS coil 47 existing in the OIS movable part, the shock absorbing spring 46 and the suspension wire 45 may be used. Furthermore, for energizing the image sensor 34 existing in the OIS movable part, a large number of energizing sections are necessary and therefore a flexible printed board (not illustrated) may be used. At this time, it is desirable to use the flexible printed board of as soft a material as possible in order to reduce the influence of springiness of the flexible printed board as much as possible.

The embodiment example 1-2 includes a position detecting section for OIS. By detecting the position of the image sensor 34 and feeding back the position to use it for position control, the accuracy of positioning to a target position can be enhanced and the image sensor 34 can be held at a predetermined position even when disturbance vibration is received. The position detecting section for OIS is composed of a magnet 48 for position detection mounted on the OIS movable part (sensor cover 43) and a Hall element 49 disposed on the fixed part (base 39) in such a manner as to be opposed to the magnet 48 for position detection. When the magnet 48 for position detection is displaced due to OIS driving, the magnitude of the density of magnetic flux incident on the Hall element 49 changes and is output as a position detection signal. In order to alleviate the influence of magnetic flux from the magnet 41 for driving and the OIS coil 47, the Hall element 49 is disposed at a position somewhat separate from them (see FIG. 9). The Hall element 49 and a terminal of the OIS coil 47 connected via the suspension wire 45 and so forth are connected to an actuator driver that is not illustrated in the diagram. The Hall element 49 may be an actuator driver in which a Hall element is incorporated. The actuator driver is a functional IC integrated on one semiconductor substrate. Note that the position detecting section for OIS illustrated in FIG. 8 is a position detecting section of the X-axis direction and a position detecting section for the Y-axis direction similarly exists in a direction shifted by 90 degrees (see FIG. 9).

The whole of the camera module 31 is covered by a cover 50. An opening 50a is made at the center of the cover 50 and serves as a path through which light is incident on the imaging lenses 32. The cover 50 has also a role as a stopper for mechanically restricting the movable range as the actuator and therefore it is desirable that the cover 50 is a metal. For example, if part of the upper surface of the lens holder 37 is protruded, the protruding part abuts against the inner surface of the cover 50 and the cover 50 works as the stopper when the AF movable part is displaced in the upward direction in FIG. 8. Because the magnets 41 for driving are disposed on the fixed part, the cover 50 may be a magnetic body. However, when the cover 50 is a magnetic body, it is desirable to separate the cover 50 from the magnet 48 for position detection by a certain level of distance.

In the embodiment example 1-2, a mechanical stopper of OIS is formed through abutting of the side surface of the sensor cover 43 against the inner wall of the base 39.

Figure 11:
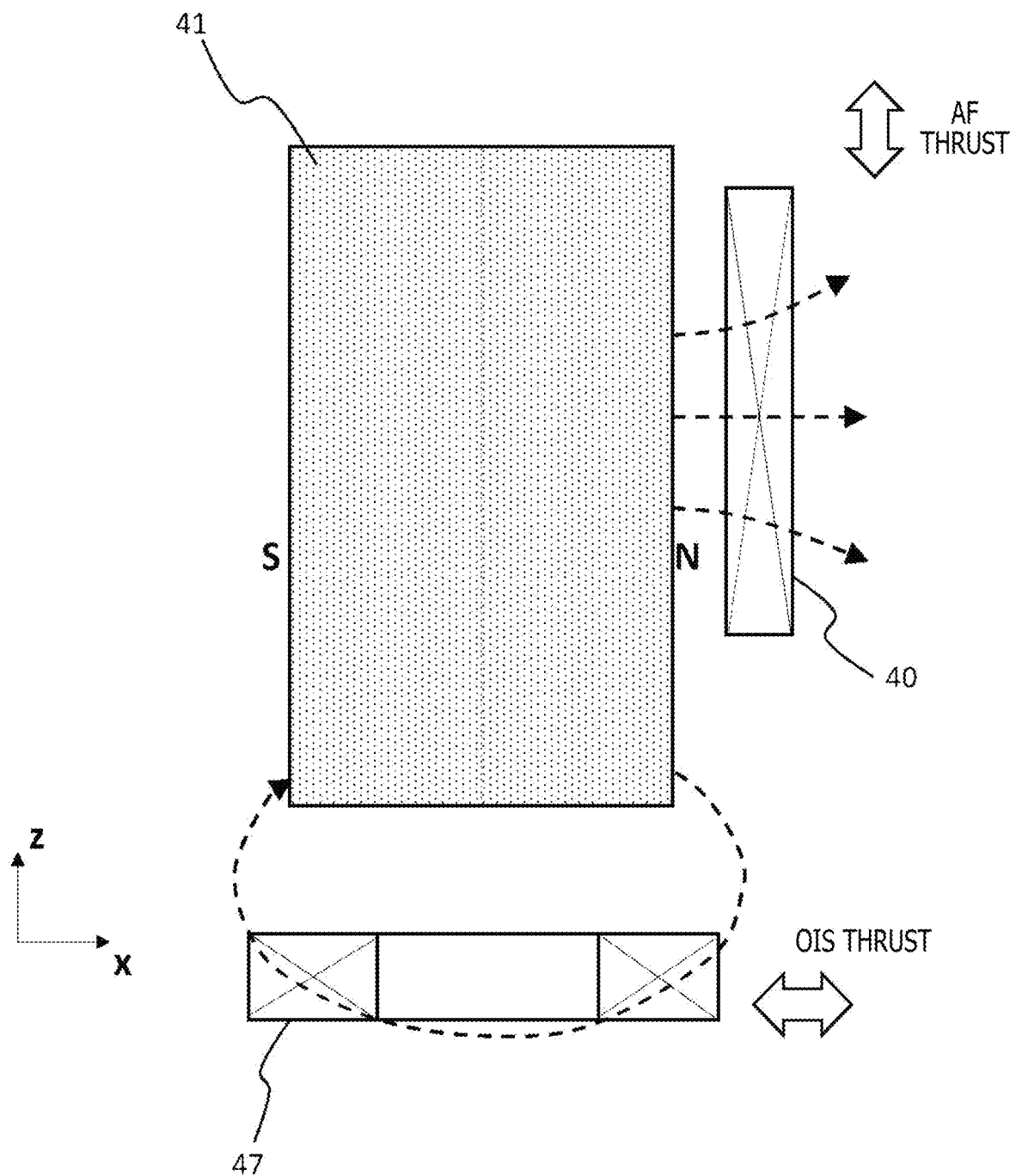
FIG. 11 is an enlarged view of the part of a magnet for driving and coils in the camera module of FIG. 8.

Next, the positional relation between the magnet 41 for driving and the OIS coil 47 and the AF coil 40 will be described by using FIG. 11. FIG. 11 is a diagram in which the part of the magnet for driving and the coils is enlarged in the camera module 31 of FIG. 8 and is a diagram illustrating schematic directions of magnetic flux incident on the coil parts. In FIG. 11, the direction of the magnetic poles is one example and the N pole and the S pole may be reversed.

While magnetic flux coming out from the N pole of the magnet 41 for driving returns to the S pole, the magnetic flux penetrates part of the OIS coil 47. At this time, when the OIS coil 47 is energized, a Lorentz force acts in the direction perpendicular to each of the direction of the magnetic flux and the direction of the current (winding direction of the coil). The magnetic flux is obliquely incident on the OIS coil 47 as illustrated in the diagram. The component of the Z-axis direction in the magnetic flux that penetrates the OIS coil 47 is in opposite directions between the right side and the left side of the coil and the current is also in opposite directions. Therefore, the direction of the Lorentz force is the same between the right side and the left side of the coil, so that OIS thrust in the X-axis direction is yielded. On the other hand, the component of the X-axis direction in the magnetic flux that penetrates the OIS coil 47 is in the same direction between the right side and the left side of the coil and the current is in opposite directions. Therefore, the forces of the right side and the left side cancel out each other.

Furthermore, the magnetic flux coming out from the N pole of the magnet 41 for driving penetrates the AF coil 40. At this time, when the AF coil 40 is energized, a Lorentz force acts in the direction perpendicular to each of the direction of the magnetic flux and the direction of the current (winding direction of the coil). The direction of the magnetic flux is the X-axis direction and the direction of the current is the Y-axis direction. Therefore, AF thrust acts in the Z-axis direction.

Note that the positional relation between the magnet 48 for position detection and the Hall element 49 is basically the same as FIG. 5 except that the vertical arrangement of them is reversed, and therefore description thereof is omitted.

First Modification Example of Embodiment Example 1-2

Figure 12:
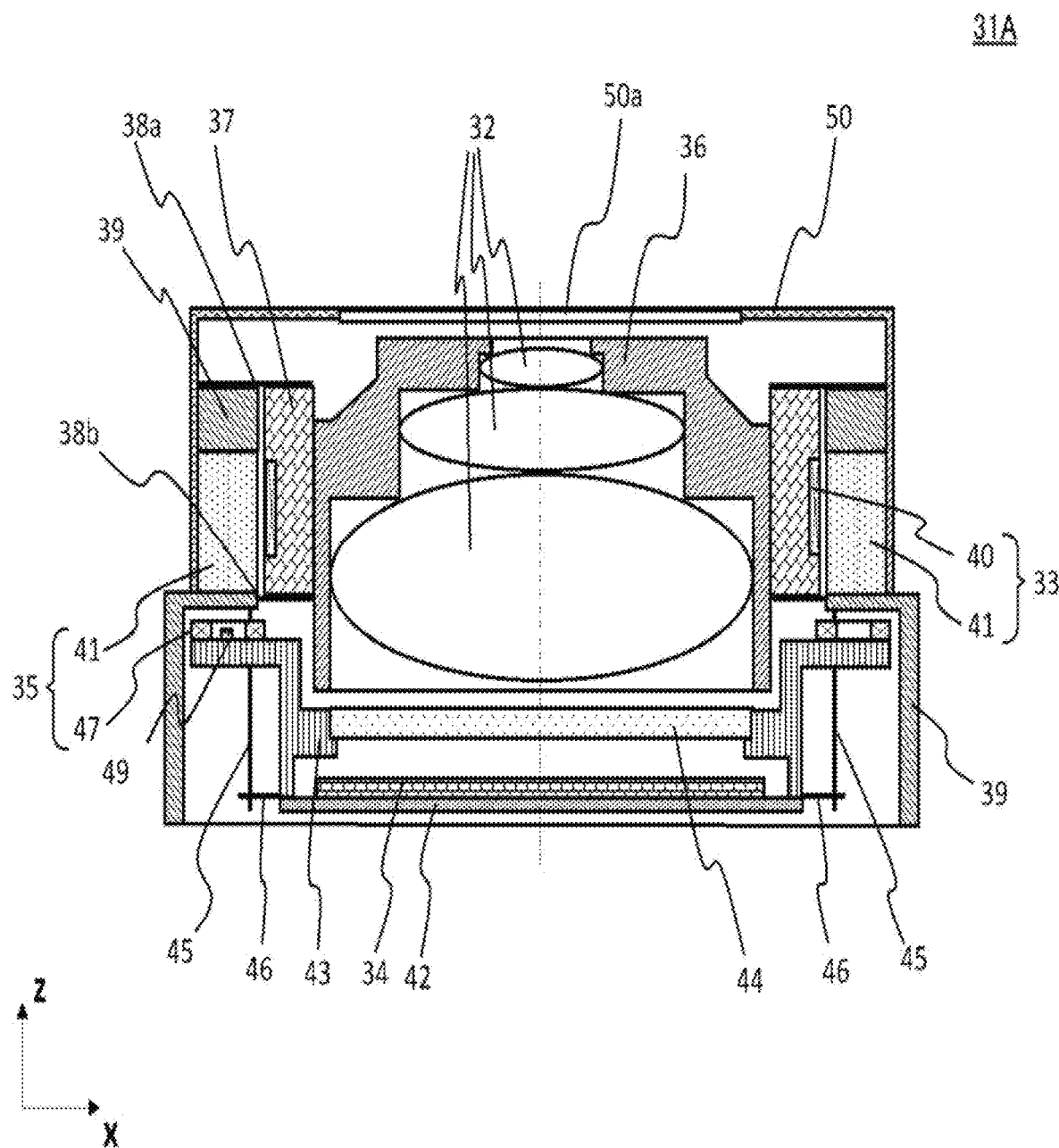
FIG. 12 is a central sectional view of a camera module according to a first modification example of an embodiment example 1-2.

In the embodiment example 1-2 of FIG. 8, the description has been made with the structure in which the magnet 48 for position detection is disposed separately from the magnet 41 for driving because the Hall element 49 for position detection of OIS is disposed on the fixed part side (base 39). However, the configuration is not limited thereto. If the Hall element 49 for position detection of OIS is disposed on the movable part side (sensor cover 43), the magnet for driving can be allowed to double as the magnet for position detection. An example in which the Hall element 49 is disposed on the movable part side as above will be described by using FIG. 12 as a first modification example of the embodiment example 1-2. FIG. 12 is a central sectional view of a camera module 31A according to the first modification example of the embodiment example 1-2.

In the first modification example of FIG. 12, the magnet 41 plays three roles as magnets for AF driving, for OIS driving, and for OIS position detection. To give the role as the magnet for OIS position detection to the magnet 41, the Hall element 49 needs to be disposed on the movable part side (sensor cover 43) in such a manner as to be opposed to the magnet 41. When this is employed, the magnet for position detection, which is necessary in FIG. 8, becomes unnecessary and the number of components can be reduced. Note that, because the Hall element 49 is newly disposed on the movable part side, an energizing section from the movable part to the fixed part needs to be considered. In the case of only the OIS coil 47, energizing sections for two terminals for the X-axis and two terminals for the Y-axis, i.e. for four terminals in total, are necessary and thus the four suspension wires 45 can be used for energization. However, when the Hall element is added thereto, energization sections for four terminals per one Hall element, i.e. for eight terminals of two Hall elements in total, need to be added. In this case, the flexible printed board for energization of the image sensor 34 may be used. The image sensor 34 and the Hall elements 49 are disposed in the same OIS movable part. Because a considerable number of energization sections are necessary as energization sections for the image sensor 34, the degree of influence is suppressed even when eight energization sections are added for the Hall elements. Note that, as described above, it is desirable to use the flexible printed board of as soft a material as possible in order to reduce the influence of springiness of the flexible printed board as much as possible.

Second Modification Example of Embodiment Example 1-2

Figure 13:
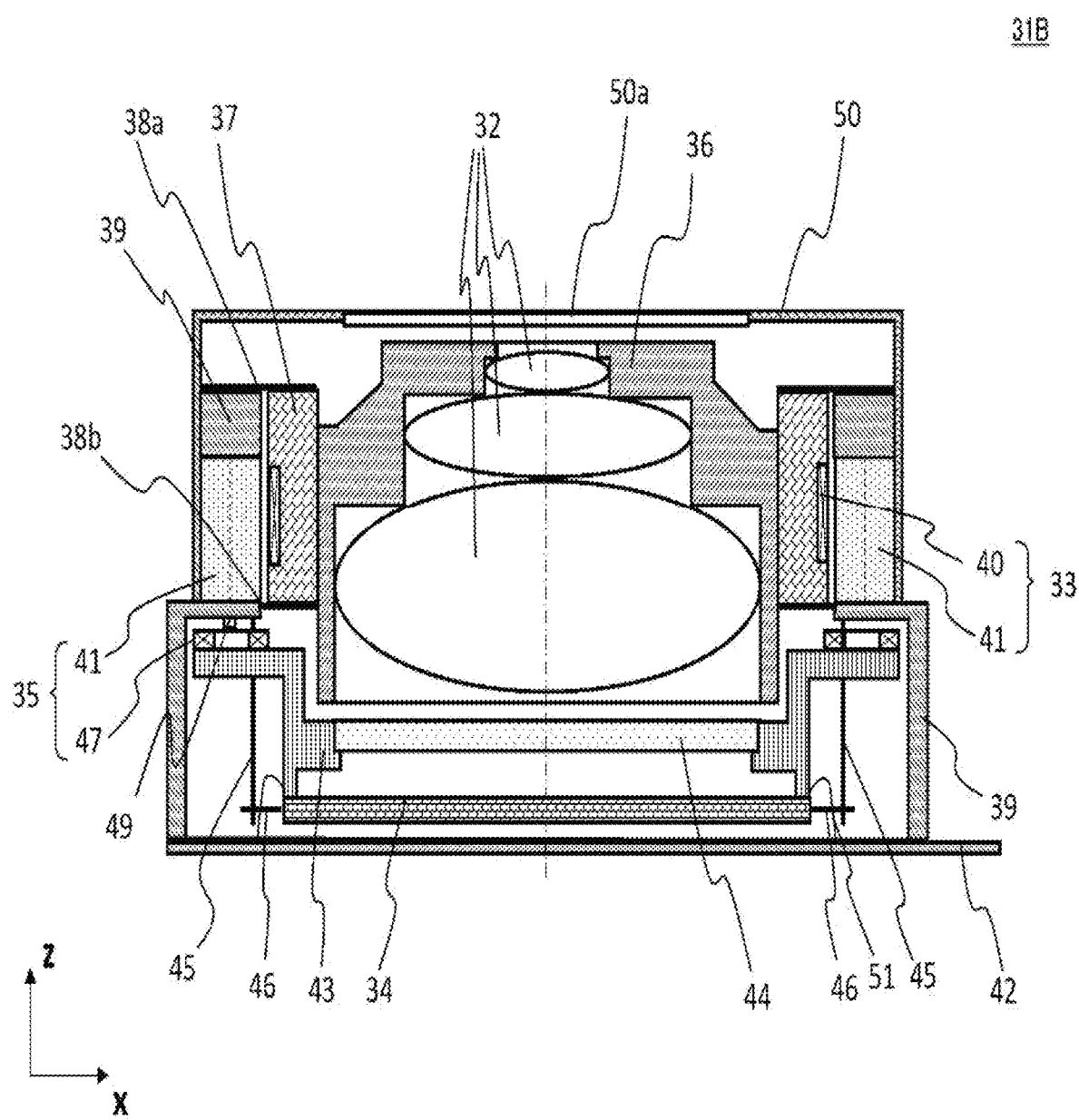
FIG. 13 is a central sectional view of a camera module according to a second modification example of the embodiment example 1-2.

In the embodiment example 1-2 of FIG. 8, it has been explained that a large number of energizing sections are necessary for energizing the image sensor 34 existing in the OIS movable part and therefore the flexible printed board (not illustrated) is used. However, the configuration is not limited thereto. An example in which bonding wires are used as energizing sections will be described by using FIG. 13 as a second modification example of the embodiment example 1-2. FIG. 13 is a central sectional view of a camera module 31B according to the second modification example of the embodiment example 1-2.

In FIG. 13, the module substrate 42 and a flexible printed board extended from it are disposed in the fixed part and bonding wires 51 are used to electrically connect the image sensor 34 existing in the OIS movable part and the module substrate 42. The number of bonding wires 51 is large. However, the springiness of each one bonding wire 51 is very weak and the influence of the springiness of the bonding wires 51 on the motion of the movable part is very small. Furthermore, when the bonding wires are used as energizing sections between the movable part and the fixed part, the difference in the springiness depending on the direction is small and thus the bonding wires are particularly effective in the present embodiment example in which the actuator of the image sensor is used for OIS.

Note that, in the embodiment example 1-1 and the embodiment example 1-2, the description has been made by taking an electromagnetic drive section as an example of the drive sections of the AF and OIS actuators. However, the configuration is not limited thereto. A method of using a piezoelectric element, a method of using a shape memory alloy (SMA), or other methods may be employed. It is also true that these drive sections each have an original merit such as capability of yielding high power or low susceptibility to the influence of magnetic interference. On the other hand, a problem of operation sound exists in the piezoelectric driving, and the SMA involves problems such as a problem that the displacement speed becomes low at the time of cooling. In contrast, the electromagnetic drive section is free from these problems. In a camera module in which reduction in the weight of the movable part is intended so that driving can be carried out even when power is low, using the electromagnetic drive section is preferable and can be expected to provide larger effects.

Furthermore, in the embodiment example 1-1 and the embodiment example 1-2, the description has been made with the spring support structure including the suspension wires as sections that supports the AF and OIS movable parts. However, the configuration is not limited thereto and a ball guide structure, shaft guide structure, or other structure may be employed. These support sections have merits such as robustness against the shock of a drop and are used in many camera modules. On the other hand, there is also a problem that operation becomes non-linear due to the influence of friction of a contact part and minute displacement becomes difficult, and so forth. In contrast, when the movable part is supported by an elastic body, the influence of friction can be avoided. Therefore, using the elastic body is more preferable. In particular, in the case of using the electromagnetic drive section, it is also envisaged that it is difficult to output power sufficient to overcome friction and therefore it is desirable to employ elastic body supporting free from friction.

Note that, as in the embodiment example 1-1 and the embodiment example 1-2, either one of the imaging lenses and the image sensor may be used for AF operation and either of them may be used for OIS operation. However, it is conceivable that the side in which reduction in the weight of the movable part is possible is employed as the side for OIS as one selection method. Compared with operation of OIS, high-speed motion is made less frequently in operation of AF and a certain level of error can also be permitted in the range of the depth of focus. Therefore, it is preferable to reduce the weight of the OIS movable part, regarding which stricter conditions are required. However, when the image sensor side is employed as the OIS movable part, the springiness of the flexible printed board for energization of the image sensor also needs to be considered and strong springiness affects OIS operation. Therefore, possibly there is also the case in which it is preferable to avoid employing the image sensor side as the OIS movable part.

Second Embodiment

Embodiment Example 2-1

Figure 14:
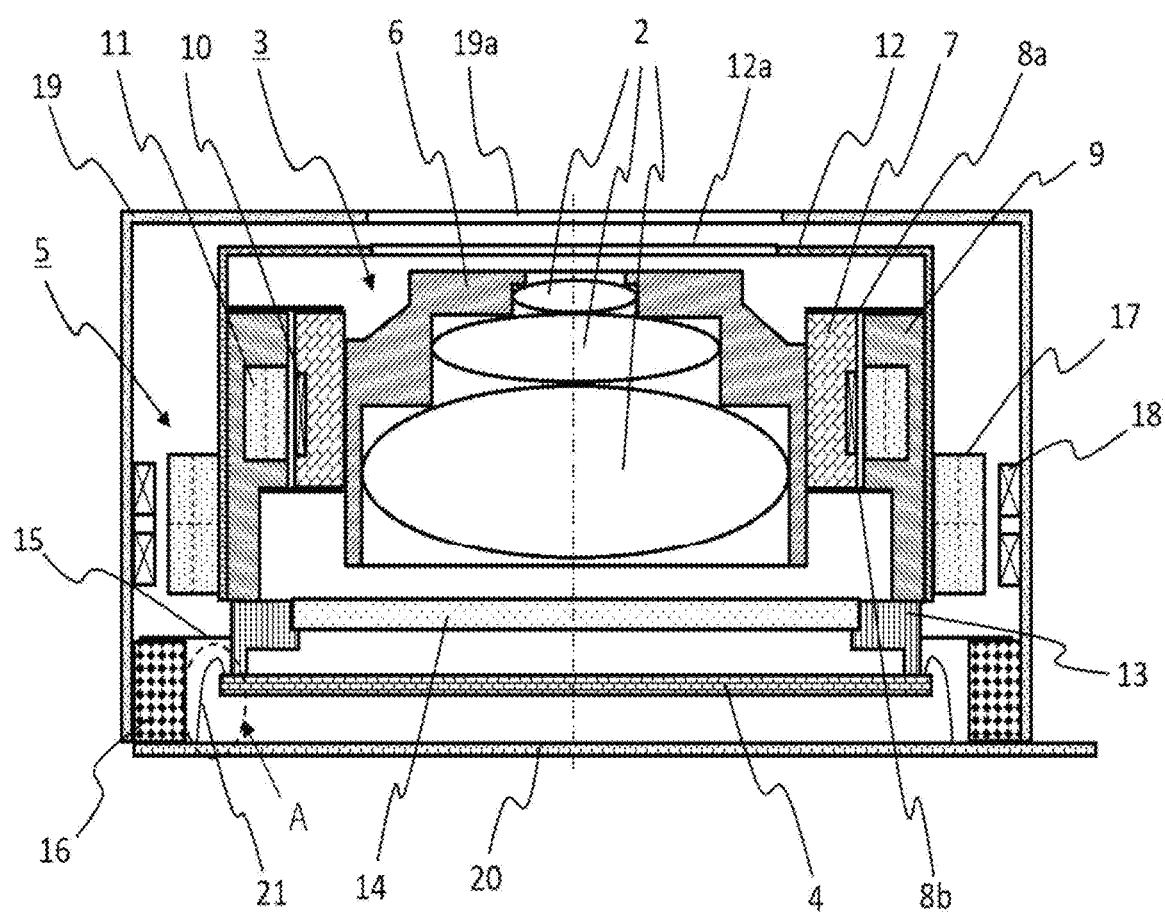
FIG. 14 is a central sectional view of a camera module according to an embodiment example 2-1 of a second embodiment.
Figure 14:
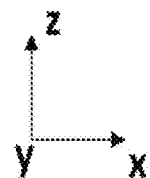
Figure 15A:
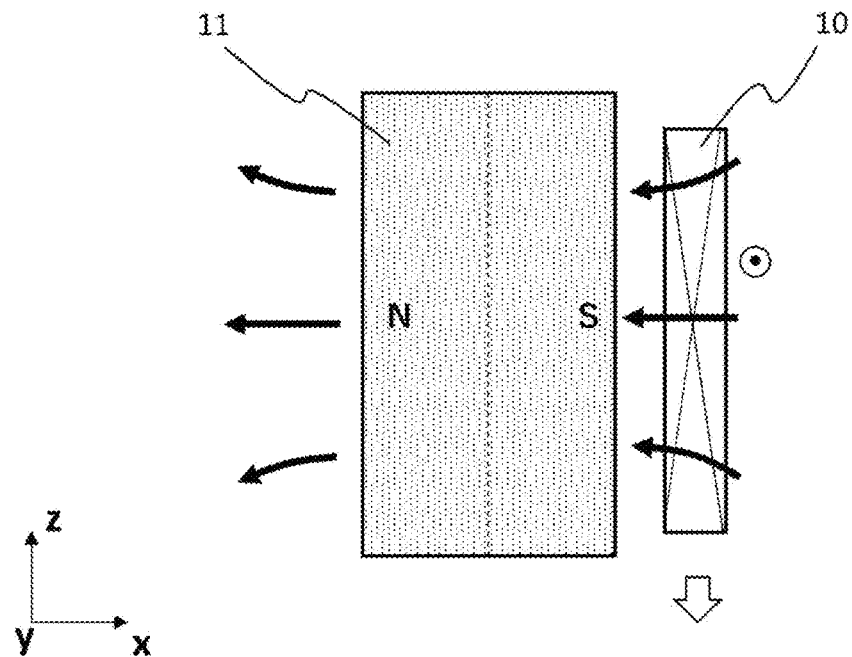
FIGS. 15A and 15B are diagrams for explaining arrangements of a magnet and a coil in the embodiment example 2-1 of FIG. 14.
Figure 15B:
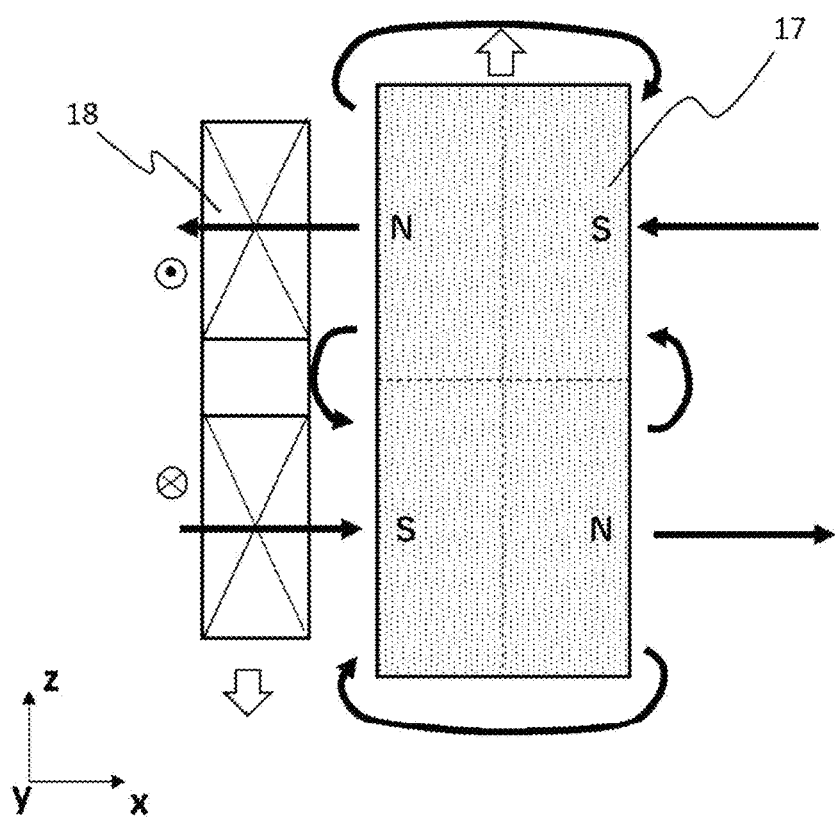
Figure 16:
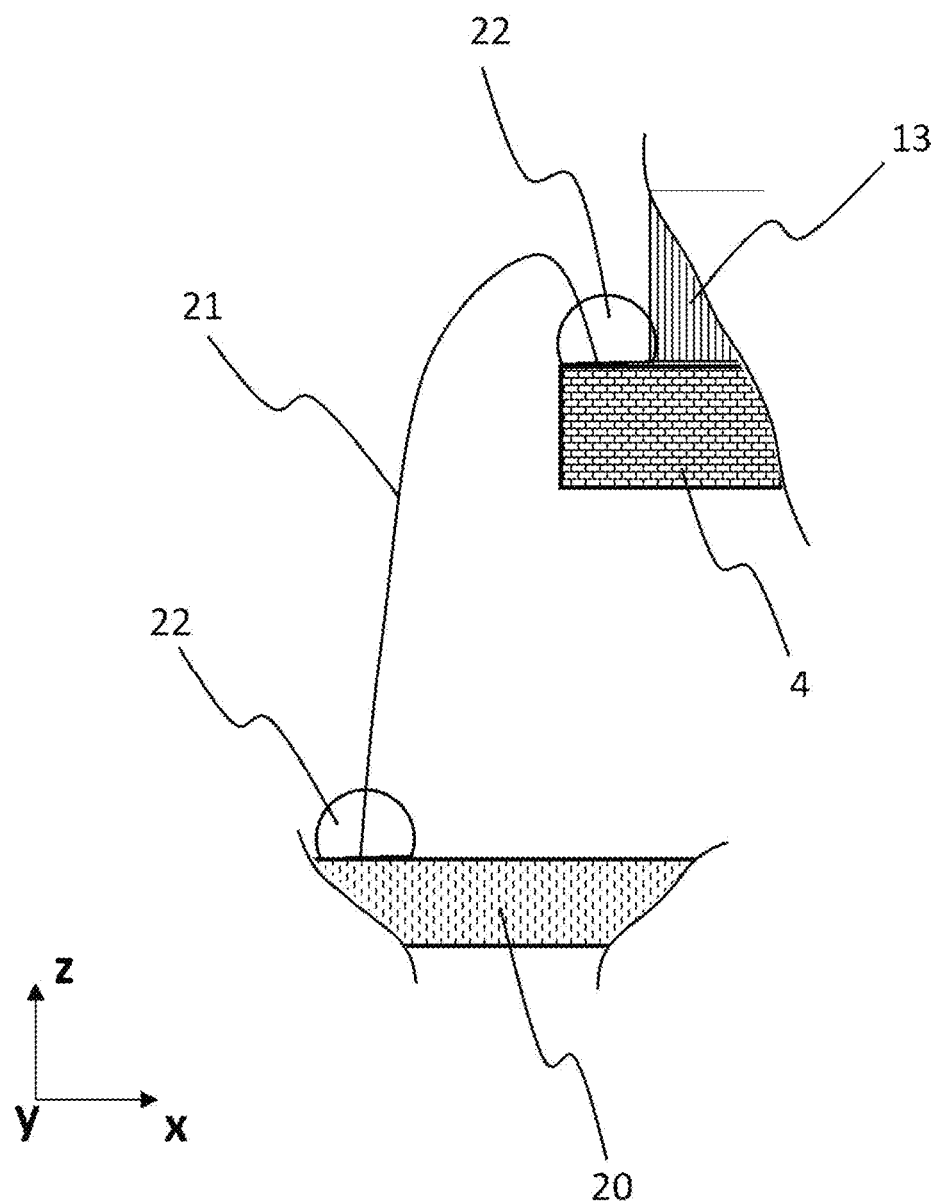
FIG. 16 is a main part enlarged view of the vicinity of a bonding wire depicted by part A in FIG. 14.

FIG. 14 is a central sectional view illustrating the schematic configuration of a camera module 1 according to an embodiment example 2-1 of the present disclosure. FIG. 15 is a diagram for explaining arrangements of a magnet and a coil in the embodiment example 2-1 of FIG. 14. FIG. 15A is a diagram for AF driving and FIG. 15B is a diagram for OIS driving. FIG. 16 is a main part enlarged view of the vicinity of a bonding wire depicted by part A in FIG. 14. The embodiment example 2-1 will be described by using FIG. 14, FIG. 15, and FIG. 16.

The camera module 1 is incorporated in a digital camera, a digital video camera, a smartphone, or a tablet terminal and is used for a picture or a video photographing. The camera module 1 according to the embodiment example 2-1 of the present disclosure is a camera module that has both an AF function and an OIS function, and regarding the OIS function, can correct a camera shake by tilting the whole of an AF camera module according to the amount of camera shake by a system generally called the module tilt system similarly to Japanese Patent Laid-open No. 2011-232707. In Japanese Patent Laid-open No. 2011-232707, a flexible wiring board is used as an energizing section for an image sensor. However, bonding wires are used in the present disclosure. A gyro sensor that is not illustrated in the diagram is used for detection of the amount of camera shake and the gyro sensor may be mounted on a substrate of the camera module, a substrate of portable equipment, or other substrates. However, if the gyro sensor is disposed in the OIS movable part (for example, disposed on the bottom surface of an image sensor), when a camera shake of the whole of the camera occurs, the camera shake can be corrected by controlling an OIS actuator in such a manner that the output of the gyro sensor in the movable part does not change. As above, by disposing the gyro sensor in the movable part, the gyro sensor can serve as functions of both detection of the camera shake and position detection. Thus, it becomes possible to remove the position detecting element for OIS. Regarding AF, a description will be made with a configuration in which a position detecting element is not disposed. However, a position detecting element may be disposed and feedback control may be carried out.

The camera module 1 includes an AF actuator 3 for driving imaging lenses 2 in the optical axis direction and an OIS actuator 5 for integrally tilting the AF actuator 3 and an image sensor 4.

The imaging lenses 2 are housed in a lens barrel 6. Although being represented as three lenses in the diagram, the imaging lenses 2 may be four or more lenses or may be two or less lenses. The lens barrel 6 is positioned and mounted in a lens holder 7. The lens holder 7 is supported by upper and lower two AF springs 8a and 8b movably in the optical axis direction (Z-axis direction in the diagram) relative to an AF base 9. An AF coil 10 is wound around the outer circumferential side surface of the lens holder 7. AF magnets 11 are fixed to the AF base 9 in such a manner as to be opposed to the AF coil 10. Magnetic flux from the AF magnet 11 acts on the AF coil 10 and a Lorentz force is generated through energizing the AF coil 10, so that an AF movable part composed of the imaging lenses 2, the lens barrel 6, the lens holder 7, the AF coil 10, and so forth is driven in the optical axis direction. Note that, for energizing the AF coil 10 existing in the AF movable part, either or both of the upper and lower AF springs 8a and 8b may be used. An energization line is formed from the AF springs 8a and 8b on the side of the AF base 9 via the image sensor 4, the bonding wires to be described later, and so forth.

The AF actuator 3 is covered by an AF cover 12 and is mounted over a sensor cover 13. An opening 12a is made at the center of the AF cover 12 and serves as a path through which light is incident on the imaging lenses 2. The AF cover 12 has also a role as a stopper for mechanically restricting the movable range as the actuator and therefore it is desirable that the AF cover 12 is a metal. An opening exists at a central part of the upper surface side of the sensor cover 13 and the opening is closed by an IR cut glass 14. The image sensor 4 is covered by the sensor cover 13. At least a light receiving part of the image sensor 4 exists inside a region surrounded by the sensor cover 13 and the IR cut glass 14 and adhesion of a foreign matter to the light receiving part is prevented. Through the above, a camera module that is composed of the AF actuator 3, the image sensor 4, and so forth and has the AF function is formed.

To achieve the function of OIS, the whole of the camera module of AF is tilted according to a camera shake signal. The camera module of AF is supported by an OIS spring 15 in such a manner as to be capable of tilt motion relative to a module base 16. It is preferable for the OIS spring 15 to have a hinge structure in which twist deformation readily occurs partly. To allow functioning as the OIS actuator 5, an OIS magnet 17 is disposed on the outer surface of the AF cover 12 and an OIS coil 18 is disposed opposed to the OIS magnet 17. The whole of the camera module 1 is covered by a module cover 19. An opening 19a is made at the center of the module cover 19 and serves as a path through which light is incident on the imaging lenses 2. The OIS coil 18 is fixed to the inner wall surface of the module cover 19. Magnetic flux from the OIS magnet 17 acts on the OIS coil 18 and a Lorentz force is generated through energizing the OIS coil 18, so that the AF camera module can make tilt motion. Note that the pair of the OIS magnet 17 and the OIS coil 18 is disposed on each of two opposed sides on the left and right sides as in the diagram, and this serves as a tilt drive section around the Y-axis, for example. Pairs of the OIS magnet and the OIS coil that are not illustrated in the diagram are similarly disposed also on the sides different from this by 90 degrees, and they serve as a tilt drive section around the X-axis. In order for the movable part to make tilt motion, the direction of the current needs to be controlled in such a manner that a downward force works on the OIS magnet on the right side in the diagram when an upward force works on the OIS magnet on the left side in the diagram.

A module substrate 20 is disposed on the bottom surface of the module base 16 and all electrical interconnect lines of the camera module 1 are finally integrated onto the module substrate 20. Because the image sensor 4 is mounted in the movable part, bonding wires 21 are used to electrically connect the image sensor 4 existing in the movable part and the module substrate 20 existing in the fixed part. Although only each one bonding wire 21 is illustrated on the left and right sides in the diagram, actually a large number of bonding wires 21 are connected. The bonding wires 21 are very thin and the springiness of each one bonding wire 21 is also weak. Therefore, even when a large number of bonding wires 21 are collected, the influence of the springiness can be reduced as much as possible compared with the case of using a flexible wiring board. Furthermore, the section of the bonding wire 21 has a substantially circular shape and the direction of the springiness when the bonding wire 21 bends does not exist. Thus, the influence of the springiness can be reduced even against motion in plural directions.

The connecting parts between the image sensor 4 and the bonding wires 21 are located outside the region surrounded by the sensor cover 13. Not only signal lines of the image sensor 4 but also terminals of the AF coil 10 and the OIS coils 18 are electrically connected to the module substrate 20 finally via the AF springs 8a and 8b, a flexible printed circuit board (FPC) that is not illustrated in the diagram, the bonding wires 21, and so forth. Even if the bonding wires 21 are used also as energizing sections of the AF coil 10, energization is easily allowed by only adding the number of bonding wires for this purpose. The number of bonding wires necessary for energization of the coils and so forth is much smaller compared with the number of bonding wires necessary for energization of the image sensor, and the influence of the addition of the number of bonding wires is small.

The terminals of the AF coil 10 and the OIS coils 18 are finally connected to an actuator driver that is not illustrated in the diagram. The actuator driver is mounted on the module substrate 20. The actuator driver is a functional IC integrated on one semiconductor substrate.

Next, the positional relation between the magnet and the coil and operation in the AF actuator 3 and the OIS actuator 5 will be described in some more detail by using FIG. 15.

FIG. 15A illustrates the positional relation between the AF coil 10 and the AF magnet 11. The AF magnet 11 is magnetized in the left-right direction in the diagram and the direction of the N pole and the S pole is set as in the diagram. The AF coil 10 is disposed opposed to the AF magnet 11. Assuming that a current flows in the AF coil 10 from the far side of the plane of paper to the near side, the AF coil 10 receives a force in the downward direction in the diagram (direction of a white arrow) in accordance with the Fleming's left hand rule. When a current in the opposite direction is made to flow, the AF coil 10 receives a force in the opposite direction. Through the above, the AF movable part is driven.

FIG. 15B illustrates the positional relation between the OIS magnet 17 and the OIS coil 18. The OIS magnet 17 is magnetized in the left-right direction in the diagram and bipolar magnetization in which the direction of the N pole and the S pole is reversed halfway as in the diagram is made. The OIS coil 18 is disposed opposed to the OIS magnet 17. The OIS coil 18 is a flat-type coil. Assuming that a current flows in the coil side on the upper side in the diagram from the far side of the plane of paper to the near side, the current flows in the coil side on the lower side from the near side of the plane of paper to the far side. At this time, the upper and lower sides of the OIS coil 18 both receive a force in the downward direction in the diagram (direction of a white arrow) in accordance with the Fleming's left hand rule. When a current in the opposite direction is made to flow, the OIS coil 18 receives a force in the opposite direction. As described above, another set of such a combination of the magnet and the coil exists on the opposed side of the camera module. When the current is controlled in such a manner that the direction of the force is in the opposite direction in this set, the OIS movable part carries out tilt operation.

Next, the structure of the bonding wire 21 that is an energizing section for the image sensor 4 will be described in some more detail by using FIG. 16.

The bonding wire 21 electrically connects the image sensor 4 existing in the movable part to the module substrate 20 existing in the fixed part. Gold is typically used as the material of the bonding wire 21. However, another metal such as aluminum may be employed. The tips of the bonding wire 21 are pressed against pads that are not illustrated in the diagram on the image sensor 4 and the module substrate 20 and the wire is connected to the pads by applying ultrasonic waves, or other application. Here, to the connecting part at the tip of the bonding wire 21, a load is applied at the time of connection and energy of the ultrasonic waves is given. Therefore, the connecting part becomes weak due to change in the wire diameter. Furthermore, moment concentrates on the tip part at the time of vibration and thus the risk of disconnection increases. In the case of wire bonding of normal large-scale integration (LSI), change from this state is not caused and the risk of disconnection does not become higher any more when the whole is fixed by a resin as a package. Furthermore, even in the case in Japanese Patent Laid-open No. 2014-127766, motion is not caused after adjustment and therefore the risk of disconnection does not become higher any more. However, in the case in which one end of the bonding wire 21 is disposed on the movable part as in the embodiment of the present disclosure, a force is typically applied to the bonding wire 21 and therefore it is better to provide a countermeasure against disconnection. Nonetheless, causing motion becomes difficult when the whole of the bonding wire 21 is fixed by a resin. Thus, it is desirable to fix only the tip parts of the bonding wire 21 by a resin 22 as in FIG. 16. It is desirable that the resin 22 used here is a resin material that does not become so hard even when being cured and has rubber-like elasticity. Because only both ends are fixed by the resin, the central part of the bonding wire 21 can freely bend.

Embodiment Example 2-2

Figure 17:
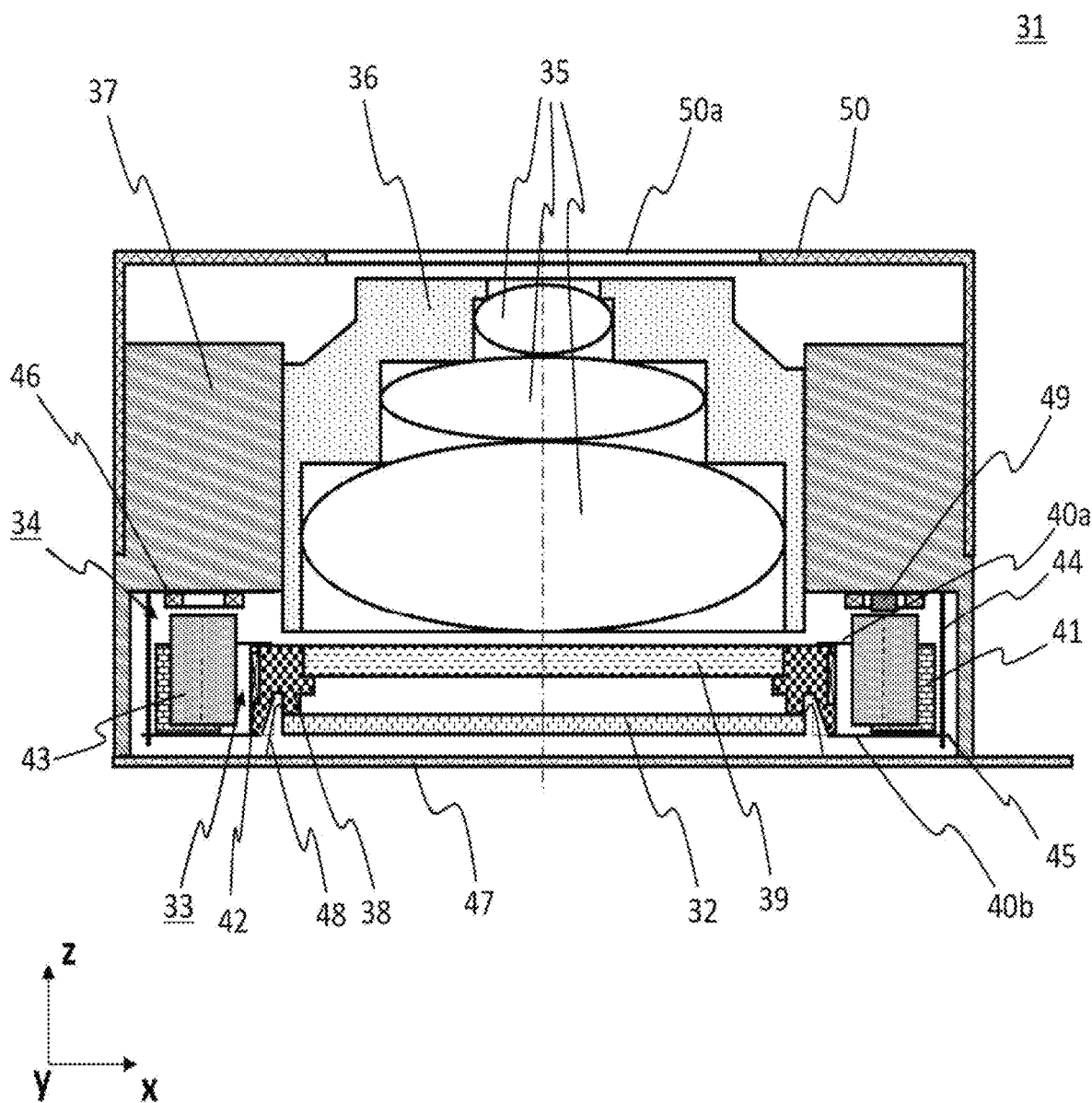
FIG. 17 is a central sectional view of a camera module according to an embodiment example 2-2 of the second embodiment.
Figure 18:
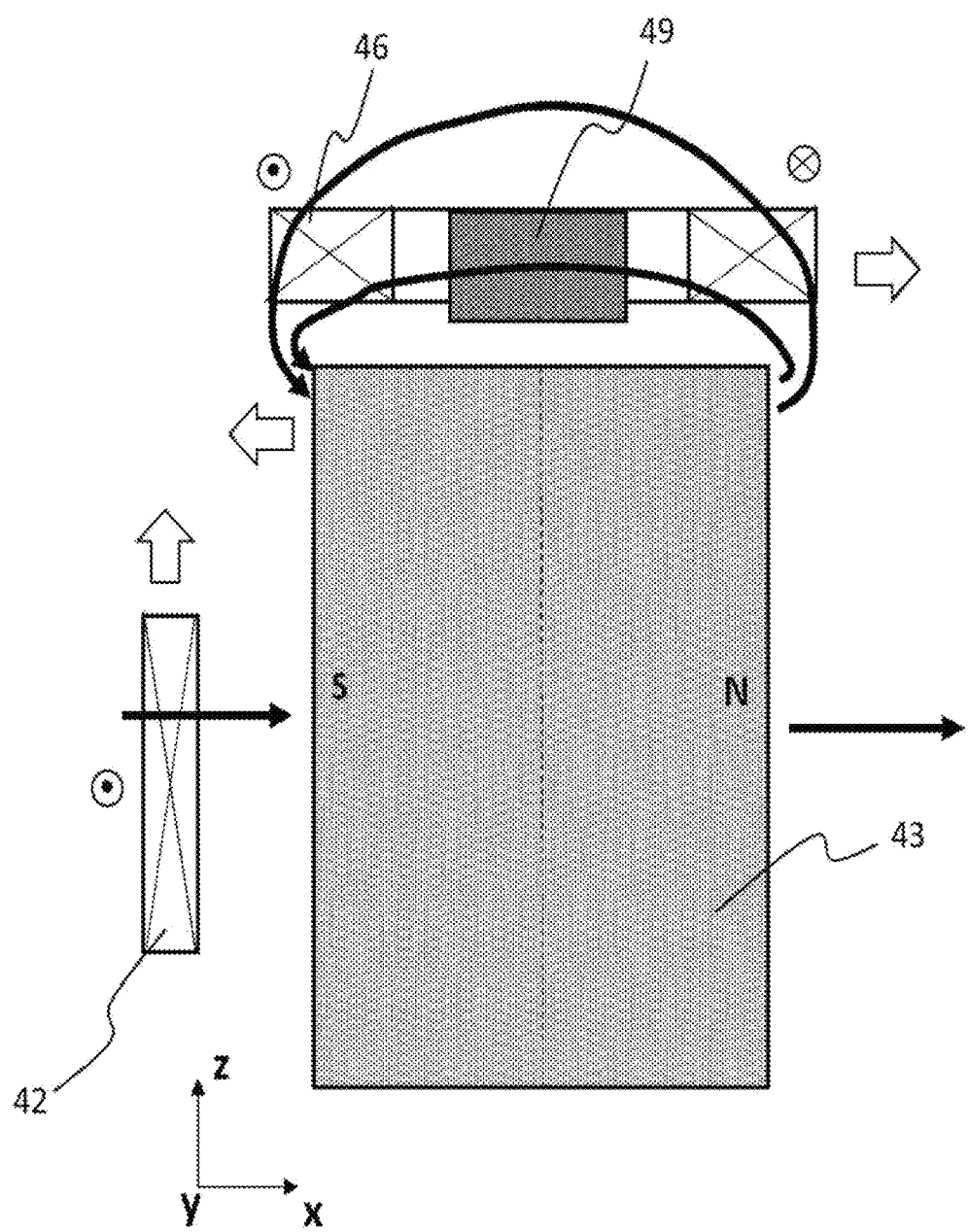
FIG. 18 is a diagram for explaining the arrangements of a magnet, coils, and a Hall element in the camera module of FIG. 17.

FIG. 17 is a central sectional view illustrating the schematic configuration of a camera module according to an embodiment example 2-2 of the present disclosure. FIG. 18 is a diagram for explaining the arrangement of a magnet, coils, and a Hall element in the embodiment example 2-2 of FIG. 17. The embodiment example 2-2 will be described by using FIG. 17 and FIG. 18.

A camera module 31 according to the embodiment example 2-2 of the present disclosure has both an AF function and an OIS function and drives an image sensor in three-axis directions for these purposes. Regarding the OIS function, a shift system in which imaging lenses and the image sensor are relatively displaced in the directions perpendicular to the optical axis is employed differently from Japanese Patent Laid-open No. 2011-232707. Bonding wires are used as energizing sections for the image sensor similarly to the embodiment example 2-1. A gyro sensor that is not illustrated in the diagram is used for detection of the amount of camera shake and the gyro sensor is mounted on a substrate of the camera module, a substrate of portable equipment, or other substrates. In order to carry out feedback control of an OIS movable part according to the amount of camera shake by the gyro sensor, the camera module 31 includes a position detecting section configured to detect the position of the OIS movable part. A description will be made on the premise that position detection is not carried out regarding AF. However, position detection and feedback control may be carried out also regarding AF.

The camera module 31 includes an AF actuator 33 for driving an image sensor 32 in the optical axis direction and an OIS actuator 34 for driving the whole of the AF actuator 33 in the directions perpendicular to the optical axis.

Imaging lenses 35 are housed in a lens barrel 36. Although being represented as three lenses in the diagram, the imaging lenses 35 may be four or more lenses or may be two or less lenses. The lens barrel 36 is positioned and mounted in a base 37. That is, the imaging lenses 35 are fixed and are not moved for AF and OIS.

The image sensor 32 is covered by a sensor cover 38. An opening exists at a central part of the upper surface side of the sensor cover 38 and the opening is closed by an IR cut glass 39. At least a light receiving part of the image sensor 32 exists inside a region surrounded by the sensor cover 38 and the IR cut glass 39 and adhesion of a foreign matter to the light receiving part is prevented. The sensor cover 38 is supported by upper and lower two AF springs 40a and 40b movably in the optical axis direction (Z-axis direction in the diagram) relative to a magnet holder 41. An AF coil 42 is wound around the outer circumferential side surface of the sensor cover 38. Magnets 43 are fixed to the magnet holder 41 in such a manner as to be opposed to the AF coil 42. Magnetic flux from the magnet 43 acts on the AF coil 42 and a Lorentz force is generated through energizing the AF coil 42, so that an AF movable part composed of the image sensor 32, the sensor cover 38, the IR cut glass 39, the AF coil 42, and so forth is driven in the optical axis direction. Note that, for energizing the AF coil 42 existing in the AF movable part, an energization line is formed via the image sensor 32, bonding wires to be described later, and so forth.

The magnet holder 41 is supported by four suspension wires 44 movably in the directions (X-axis direction and Y-axis direction in the diagram) perpendicular to the optical axis. The suspension wires 44 are not directly connected to the magnet holder 41 and the lower ends of the suspension wires 44 are connected through shock absorbing springs 45. The shock absorbing springs 45 are components for absorbing shock in the longitudinal direction of the suspension wire 44. The suspension wire 44 has a small permissible amount of expansion and contraction in the longitudinal direction and easily breaks due to the shock of a drop or other shock. Therefore, the shock absorbing spring 45 bends instead of expansion and contraction of the suspension wire 44 and prevents the breakage of the suspension wire 44. The upper ends of the suspension wires 44 are connected to the base 37, which is a fixed part. When being used for energization, the suspension wires 44 may be connected to a flexible printed circuit board (FPC) (not illustrated) stuck to the base 37. In such a case, the lower ends and upper ends of the suspension wires 44 may be fixed to the shock absorbing springs 45 and the FPC, respectively, by solder. An OIS coil 46 is fixed to the lower surface of the base 37 in such a manner as to be opposed to the magnet 43. The magnetic flux from the magnet 43 acts on the OIS coil 46 and a Lorentz force is generated through energizing the OIS coil 46, so that the OIS movable part composed of the AF actuator 33, the magnet holder 41, the magnet 43, and so forth is driven in the directions perpendicular to the optical axis. The magnet 43 is used both as the magnet for OIS driving and as the magnet for AF driving. By sharing a common magnet for OIS and for AF as above, the number of components can be reduced.

A module substrate 47 is disposed on the bottom surface of the base 37 and all electrical interconnect lines of the camera module 31 are finally integrated onto the module substrate 47. Because the image sensor 32 is mounted in the movable part, bonding wires 48 are used to electrically connect the image sensor 32 existing in the movable part and the module substrate 47 existing in the fixed part. Although only each one bonding wire 48 is illustrated on the left and right sides in the diagram, actually a large number of bonding wires 48 are connected. The bonding wires 48 are very thin and the springiness of each one bonding wire 48 is also weak. Therefore, even when a large number of bonding wires 48 are collected, the influence of the springiness can be reduced as much as possible compared with the case of using a flexible wiring board. Furthermore, the section of the bonding wire 48 has a substantially circular shape and the direction of the springiness when the bonding wire 48 bends does not exist. Thus, the influence of the springiness can be reduced even against motion in plural directions. This is effective when the image sensor 32 is driven in the three-axis directions as in the embodiment example 2-2 particularly. Note that it is desirable that the connecting parts of the bonding wires 48 at both ends are fixed by a resin similarly to the embodiment example 2-1.

The connecting parts between the image sensor 32 and the bonding wires 48 are located outside the region surrounded by the sensor cover 38. Not only signal lines of the image sensor 32 but also the AF coil 42 is electrically connected to the module substrate 47 finally via the bonding wires 48. Even if the bonding wires 48 are used also as energizing sections of the AF coil 42, energization is easily allowed by only adding the number of bonding wires for this purpose. The number of bonding wires necessary for energization of the coil is much smaller compared with the number of bonding wires necessary for energization of the image sensor, and the influence of the addition of the number of bonding wires is small. Note that, regarding the electrical path of the AF coil 42, the AF coil 42 may be connected to an FPC (not illustrated) on which the OIS coil 46 is mounted via the AF springs 40a and 40b, the shock absorbing spring 45, the suspension wire 44, and so forth and the FPC may be connected to the module substrate 47.

The embodiment example 2-2 includes a position detecting section for OIS. By detecting the position of the image sensor 32 and feeding back the position to use it for position control, the accuracy of positioning to a target position can be enhanced and the image sensor 32 can be held at a predetermined position even when disturbance vibration is received. The position detecting section for OIS is composed of the magnet 43 and a Hall element 49 disposed on the base 37 in such a manner as to be opposed to the magnet 43. When the magnet 43 is displaced due to OIS driving, the magnitude of the density of magnetic flux incident on the Hall element 49 changes and is output as a position detection signal. The Hall element 49 is disposed inside the winding of the OIS coil 46 and space saving is intended. However, magnetic flux generated by energization of the coil is incident on the Hall element disposed inside the winding of the coil and becomes noise. Therefore, when avoidance of this is desired, the Hall element may be disposed outside the winding of the coil. The magnet 43 is utilized as not only a role as the drive magnet for AF and OIS but also part of the position detecting a section of OIS. The Hall element 49 is connected to the FPC (not illustrated) on which the OIS coil 46 is mounted.

The Hall element 49 and terminals of the OIS coils 46, the AF coil 42, and so forth are connected to an actuator driver that is not illustrated in the diagram. The actuator driver is mounted on the module substrate 47. The Hall element 49 may be an actuator driver in which a Hall element is incorporated. The actuator driver is a functional IC integrated on one semiconductor substrate. Note that the OIS coils 46 and the Hall element 49 illustrated in FIG. 17 are position detecting sections of the X-axis direction and OIS coils and a Hall element for the Y-axis direction similarly exist in a direction shifted by 90 degrees.

The whole of the camera module 31 is covered by a cover 50. An opening 50a is made at the center of the cover 50 and serves as a path through which light is incident on the imaging lenses 35.

Next, the positional relation among the magnet, the coil, and the Hall element and operation in the AF actuator 33 and the OIS actuator 34 will be described in some more detail by using FIG. 18.

While magnetic flux coming out from the N pole of the magnet 43 returns to the S pole, the magnetic flux penetrates part of the OIS coil 46. At this time, when the OIS coil 46 is energized, a Lorentz force acts in the direction perpendicular to each of the direction of the magnetic flux and the direction of the current (winding direction of the coil). The magnetic flux is obliquely incident on the OIS coil 46 as illustrated in the diagram. The component of the Z-axis direction in the magnetic flux that penetrates the OIS coil 46 is in opposite directions between the right side and the left side of the coil and the current is also in opposite directions. Therefore, the direction of the Lorentz force is the same between the right side and the left side of the coil, so that OIS thrust in the X-axis direction is yielded. On the other hand, the component of the X-axis direction in the magnetic flux that penetrates the OIS coil 46 is in the same direction between the right side and the left side of the coil and the current is in opposite directions. Therefore, the forces of the right side and the left side cancel out each other. The OIS coil 46 is a flat type. Assuming that a current flows in the side on the left side in the diagram in the direction from the far side of the plane of paper to the near side, the current flows in the side on the right side in the direction from the near side of the plane of paper to the far side and the OIS coil 46 receives a Lorentz force in the rightward direction in the diagram. Because the OIS coil 46 is fixed to the base 37, the Lorentz force becomes a force that tries to move the magnet 43 to the left side due to reaction.

Furthermore, magnetic flux that returns to the S pole of the magnet 43 penetrates the AF coil 42. At this time, when the AF coil 42 is energized, a Lorentz force acts in the direction perpendicular to each of the direction of the magnetic flux and the direction of the current (winding direction of the coil). The direction of the magnetic flux is the X-axis direction and the direction of the current is the Y-axis direction. Therefore, AF thrust acts in the Z-axis direction. Assuming that a current flows in the AF coil 42 in the direction from the far side of the plane of paper to the near side as in the diagram, the Lorentz force acts to try to move the AF coil 42 in the upward direction.

The Hall element 49 detects the magnetic flux density of the direction perpendicular to the chip surface thereof (in the diagram, Z-axis direction) and the orientation thereof. As in FIG. 18, when the Hall element 49 exists at a position opposed to a polarization line (depicted by a dashed line) of the magnet 43, the magnetic flux is in the X-axis direction at the position of the Hall element 49 and therefore the magnetic flux density detected by the Hall element 49 is 0. However, when the magnet 43 is shifted in the X-axis direction, the magnetic flux incident on the Hall element 49 has a component of the Z-axis direction and a Hall detection signal according to the amount of displacement is obtained.

Embodiment Example 2-3

Figure 19:
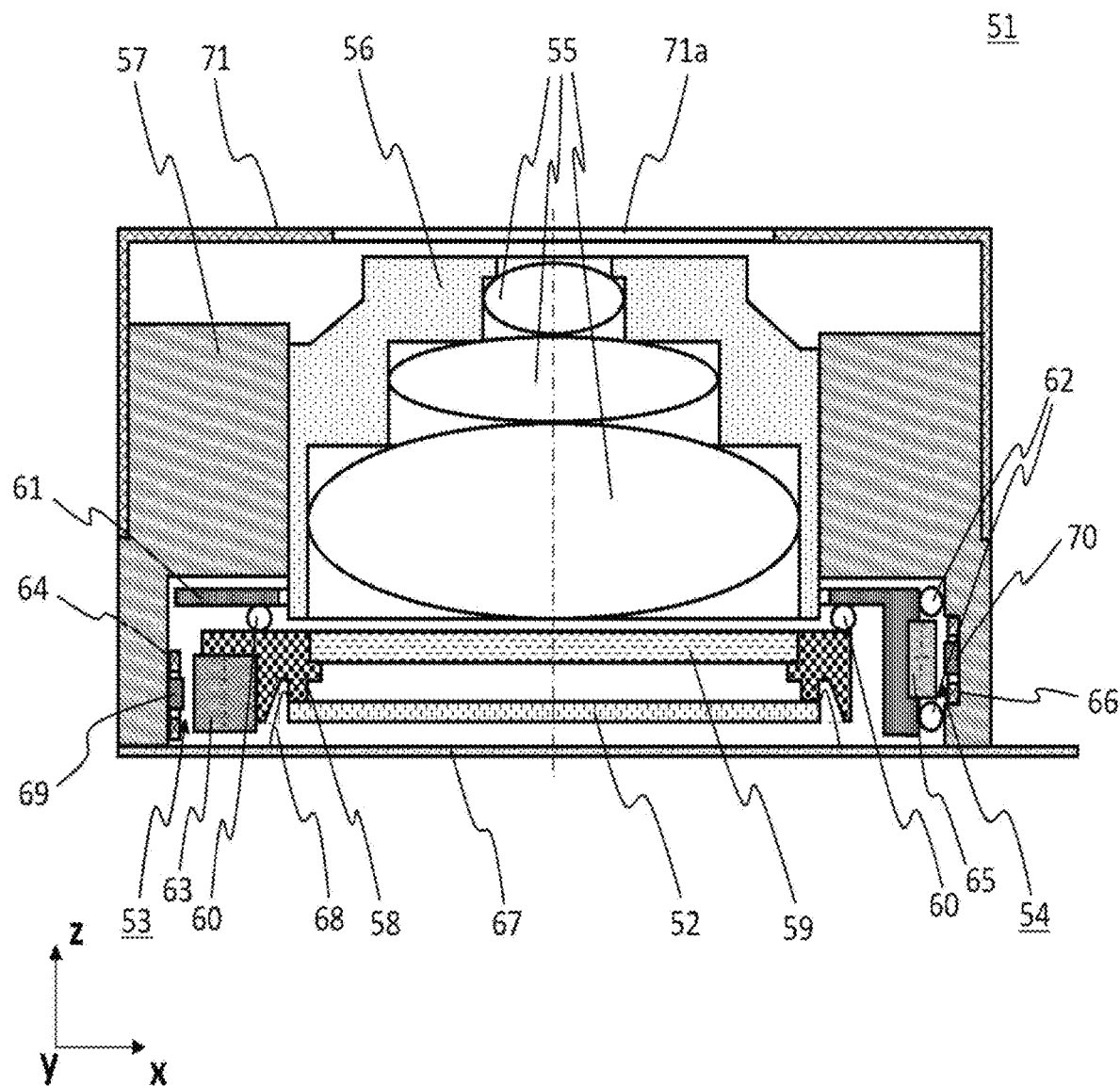
FIG. 19 is a central sectional view of a camera module according to an embodiment example 2-3 of the second embodiment.
Figure 20A:
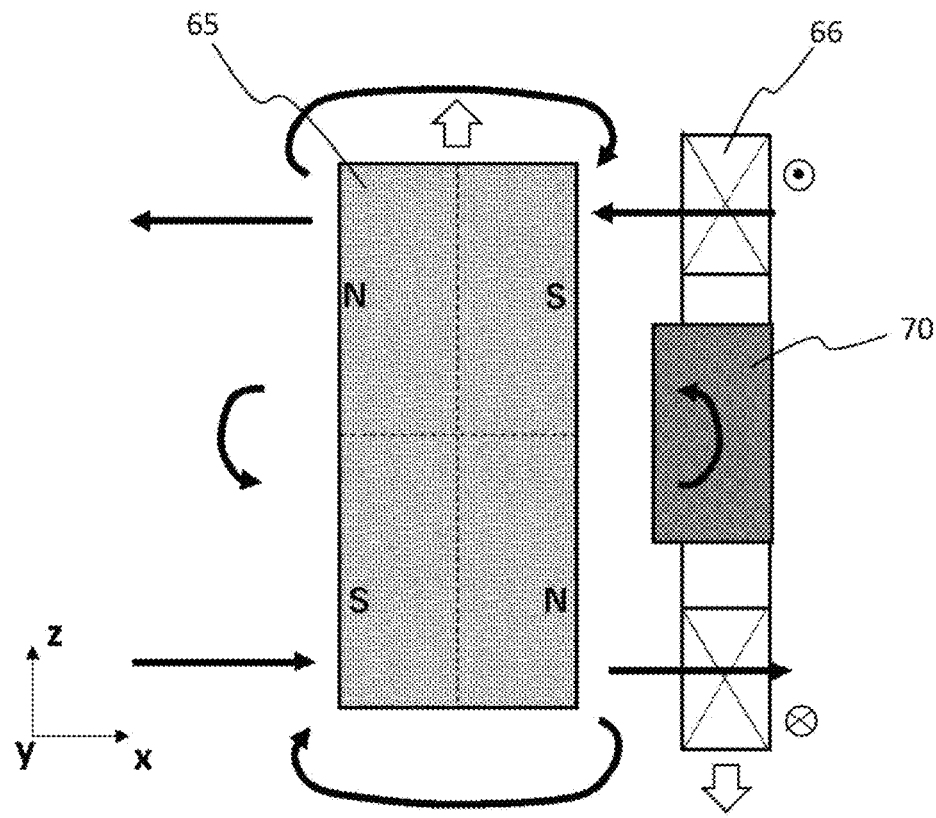
FIGS. 20A and 20B are diagrams for explaining the arrangements of a magnet, a coil, and a Hall element in the camera module of FIG. 19.
Figure 20B:
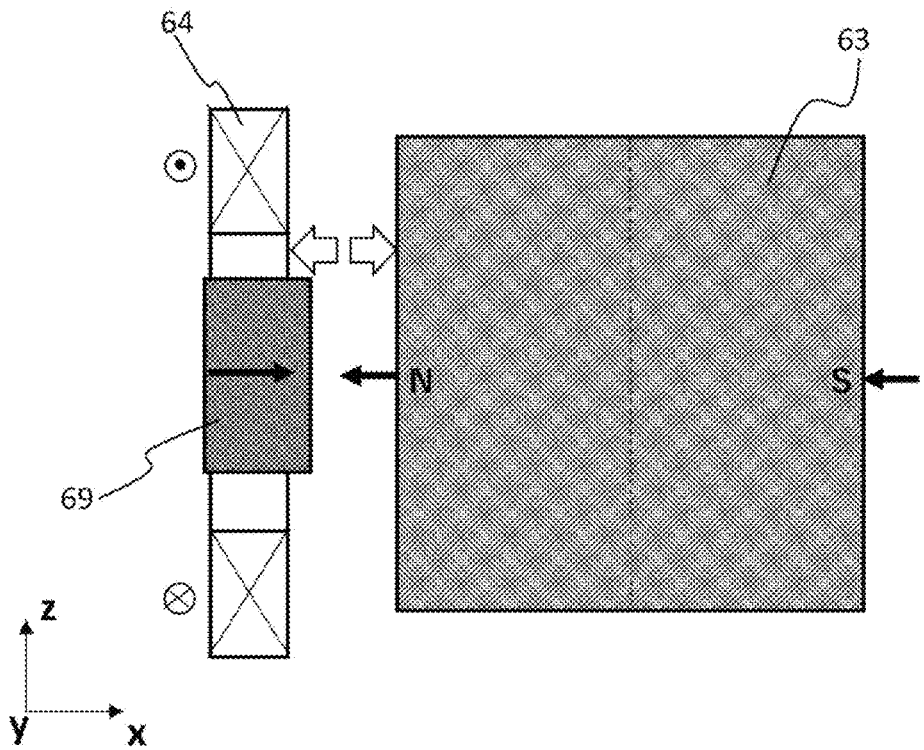

FIG. 19 is a central sectional view illustrating the schematic configuration of a camera module according to an embodiment example 2-3 of the present disclosure. FIG. 20 is a diagram for explaining arrangements of a magnet, a coil, and a Hall element in the embodiment example 2-3 of FIG. 19. FIG. 20A is a diagram for AF driving and FIG. 20B is a diagram for OIS driving. The embodiment example 2-3 will be described by using FIG. 19 and FIG. 20.

A camera module 51 according to the embodiment example 2-3 of the present disclosure has both an AF function and an OIS function and drives an image sensor in three-axis directions for these purposes. Regarding the OIS function, a shift system in which imaging lenses and the image sensor are relatively displaced in the directions perpendicular to the optical axis is employed. Bonding wires are used as energizing sections for the image sensor. The above is the same as the embodiment example 2-2. The difference from the embodiment example 2-2 is that a ball guide is used in the embodiment example 2-3 whereas springs and suspension wires are used as support sections of the movable part in the embodiment example 2-2. The present disclosure can be applied also to an image sensor actuator using balls as support sections.

A gyro sensor that is not illustrated in the diagram is used for detection of the amount of camera shake and the gyro sensor is mounted on a substrate of the camera module, a substrate of portable equipment, or other substrates. In order to carry out feedback control of an OIS movable part according to the amount of camera shake by the gyro sensor, the camera module 51 includes a position detecting section configured to detect the position of the OIS movable part. Furthermore, also regarding AF, the camera module 51 includes a position detecting section and carries out position control based on feedback control because holding at a neutral position is difficult with the ball guide structure.

The camera module 51 includes an OIS actuator 53 for driving an image sensor 52 in the directions perpendicular to the optical axis and an AF actuator 54 for driving the whole of the OIS actuator 53 in the optical axis direction.

Imaging lenses 55 are housed in a lens barrel 56. Although being represented as three lenses in the diagram, the imaging lenses 55 may be four or more lenses or may be two or less lenses. The lens barrel 56 is positioned and mounted in a base 57. That is, the imaging lenses 55 are fixed and are not moved for AF and OIS.

The image sensor 52 is covered by a sensor cover 58. An opening exists at a central part of the upper surface side of the sensor cover 58 and the opening is closed by an IR cut glass 59. At least a light receiving part of the image sensor 52 exists inside a region surrounded by the sensor cover 58 and the IR cut glass 59 and adhesion of a foreign matter to the light receiving part is prevented. The sensor cover 58 is supported with respect to an OIS base 61 by balls 60 for OIS movably in the X- and Y-axis directions in the diagram. In the diagram, a structure is illustrated in which the balls 60 for OIS have a one-layer structure and roll in two-axis directions of X and Y. However, a structure may be employed in which balls are provided with a two-layer structure and roll in one axis direction in each one layer. The OIS base 61 is supported with respect to the base 57 by balls 62 for AF movably in the Z-axis direction in the diagram. The structure in which the movable part is supported by balls as above has a merit that the risk of occurrence of unnecessary resonance like that in the case of supporting by springs is low, whereas has also a demerit that the influence of friction is received. The support section may be selected depending on what is given priority.

An OIS magnet 63 is fixed to the sensor cover 58. An OIS coil 64 is fixed to the base 57 in such a manner as to be opposed to the OIS magnet 63. The OIS coil 64 becomes an electromagnet through energizing the OIS coil 64 and the OIS movable part composed of the image sensor 52, the sensor cover 58, the IR cut glass 59, the OIS magnet 63, and so forth is driven in the directions perpendicular to the optical axis by magnetic interaction between the OIS coil 64 and the OIS magnet.

Meanwhile, an AF magnet 65 is fixed to the OIS base 61. An AF coil 66 is fixed to the base 57 in such a manner as to be opposed to the AF magnet 65. Magnetic flux from the AF magnet 65 acts on the AF coil 66 and a Lorentz force is generated through energizing the AF coil 66, so that an AF movable part composed of the OIS movable part, the balls 60 for OIS, the OIS base 61, the AF magnet 65, and so forth is driven in the optical axis direction.

A module substrate 67 is disposed on the bottom surface of the base 57 and all electrical interconnect lines of the camera module 51 are finally integrated onto the module substrate 67. Because the image sensor 52 is mounted in the movable part, bonding wires 68 are used to electrically connect the image sensor 52 existing in the movable part and the module substrate 67 existing in the fixed part. The connecting parts between the image sensor 52 and the bonding wires 68 are located outside the region surrounded by the sensor cover 58. Although only each one bonding wire 68 is illustrated on the left and right sides in the diagram, actually a large number of bonding wires 68 are connected. The bonding wires 68 are very thin and the springiness of each one bonding wire 68 is also weak. Therefore, even when a large number of bonding wires 68 are collected, the influence of the springiness can be reduced as much as possible. Furthermore, the section of the bonding wire 68 has a substantially circular shape and the direction of the springiness when the bonding wire 68 bends does not exist. Thus, the influence of the springiness can be reduced even against motion in plural directions. This is effective when the image sensor 52 is driven in the three-axis directions particularly. Note that it is desirable that the connecting parts of the bonding wires 68 at both ends are fixed by a resin similarly to the embodiment example 2-1.

The embodiment example 2-3 includes a position detecting section for OIS and for AF. By detecting the position of the image sensor 52 and feeding back the position to use it for position control, the accuracy of positioning to a target position can be enhanced and the image sensor 52 can be held at a predetermined position even when disturbance vibration is received. The position detecting section for OIS is composed of the OIS magnet 63 and a Hall element 69 disposed on the base 57 in such a manner as to be opposed to the OIS magnet 63. When the OIS magnet 63 is displaced due to OIS driving, the magnitude of the density of magnetic flux incident on the Hall element 69 changes and is output as a position detection signal. The Hall element 69 is disposed inside the winding of the OIS coil 64 and space saving is intended. However, magnetic flux generated by energization of the coil is incident on the Hall element disposed inside the winding of the coil and becomes noise. Therefore, when avoidance of this is desired, the Hall element may be disposed outside the winding of the coil. The Hall element 69 is connected to an FPC (not illustrated) on which the OIS coil 64 is mounted.

Meanwhile, the position detecting section for AF is composed of the AF magnet 65 and a Hall element 70 disposed on the base 57 in such a manner as to be opposed to the AF magnet 65. When the AF magnet 65 is displaced due to AF driving, the magnitude of the density of magnetic flux incident on the Hall element 70 changes and is output as a position detection signal. The Hall element 70 is disposed inside the winding of the AF coil 66 and space saving is intended. However, the Hall element 70 may be disposed outside the winding similarly to OIS. The Hall element 70 is connected to an FPC (not illustrated) on which the AF coil 66 is mounted.

The Hall elements 69 and 70 and terminals of the OIS coil 64, the AF coil 66, and so forth are connected to an actuator driver that is not illustrated in the diagram. The actuator driver is mounted on the module substrate 67. The Hall elements 69 and 70 may be an actuator driver in which a Hall element is incorporated. The actuator driver is a functional IC integrated on one semiconductor substrate. Note that the OIS coil 64 and the Hall element 69 illustrated in FIG. 19 are position detecting sections of the X-axis direction and an OIS coil and a Hall element for the Y-axis direction similarly exist in a direction shifted by 90 degrees.

The whole of the camera module 51 is covered by a cover 71. An opening 71*a* is made at the center of the cover 71 and serves as a path through which light is incident on the imaging lenses 55.

Next, the positional relation among the magnet, the coil, and the Hall element and operation in the OIS actuator 53 and the AF actuator 54 will be described in some more detail by using FIG. 20.

FIG. 20A illustrates the positional relation among the AF coil 66, the AF magnet 65, and the Hall element 70. The AF magnet 65 is magnetized in the left-right direction in the diagram and bipolar magnetization in which the direction of the N pole and the S pole is reversed halfway as in the diagram is made. The AF coil 66 is disposed opposed to the AF magnet 65. The AF coil 66 is a flat-type coil. Assuming that a current flows in the coil side on the upper side in the diagram from the far side of the plane of paper to the near side, the current flows in the coil side on the lower side from the near side of the plane of paper to the far side. At this time, the upper and lower sides of the AF coil 66 both receive a force in the downward direction in the diagram (direction of a white arrow) in accordance with the Fleming's left hand rule. The AF coil 66 is fixed to the base 57, the AF magnet receives a force in the upward direction in the diagram (direction of a white arrow) due to reaction thereof and is displaced. When a current in the opposite direction is made to flow, the AF magnet receives a force in the opposite direction. The Hall element 70 detects the magnetic flux density of the direction perpendicular to the chip surface thereof (in the diagram, X-axis direction) and the orientation thereof. As in FIG. 20, when the Hall element 70 exists at a position opposed to the inversion boundary line (depicted by a dashed line) of the bipolar magnetization of the AF magnet 65, the magnetic flux is in the Z-axis direction at the position of the Hall element 70 and therefore the magnetic flux density detected by the Hall element 70 is 0. However, when the AF magnet 65 is shifted in the Z-axis direction, the magnetic flux incident on the Hall element 70 has a component of the X-axis direction and a Hall detection signal according to the amount of displacement is obtained.

Meanwhile, FIG. 20B illustrates the positional relation among the OIS magnet 63, the OIS coil 64, and the Hall element 69. The OIS coil 64 is a flat type. As in the diagram, assuming that a current is made to flow in the side of the OIS coil 64 on the upper side in the direction from the far side of the plane of paper to the near side, the current flows in the side on the lower side in the direction from the near side of the plane of paper to the far side. At this time, the OIS coil 64 acts as an electromagnet and magnetic flux is generated toward the right side in the diagram. Assuming that the magnetization direction of the OIS magnet 63 is as illustrated in the diagram, the OIS magnet 63 and the OIS coil 64 repel each other and the OIS magnet 63 is displaced to the right side in the diagram because the OIS coil 64 is fixed to the base 57. When a current in the opposite direction is made to flow, the OIS magnet 63 and the OIS coil 64 attract each other and the OIS magnet 63 is displaced to the left side in the diagram. The Hall element 69 detects the magnetic flux density of the direction perpendicular to the chip surface thereof (in the diagram, X-axis direction) and the orientation thereof. As in FIG. 20, the Hall element 69 is disposed opposed to a magnetic pole face (in the diagram, N pole) of the OIS magnet 63. The magnitude of the density of magnetic flux incident on the Hall element 69 changes according to the distance from the OIS magnet 63 and a Hall detection signal according to the amount of displacement is obtained.

Embodiment Example 2-4

Figure 21:
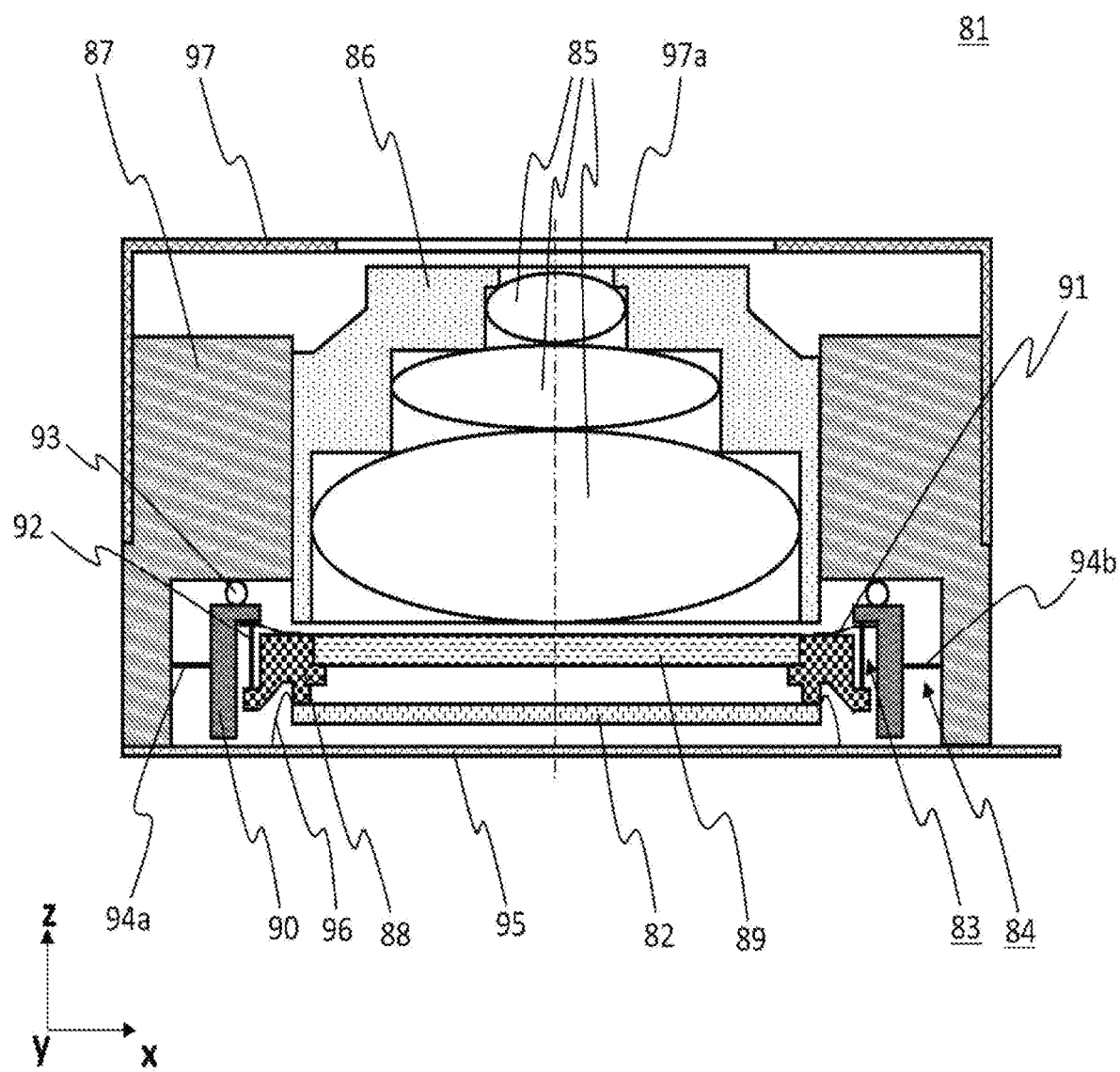
FIG. 21 is a central sectional view of a camera module according to an embodiment example 2-4 of the second embodiment.

FIG. 21 is a central sectional view illustrating the schematic configuration of a camera module according to an embodiment example 2-4 of the present disclosure. The embodiment example 2-4 will be described by using FIG. 21.

A camera module 81 according to the embodiment example 2-4 of the present disclosure has both an AF function and an OIS function and drives an image sensor in three-axis directions for these purposes. Regarding the OIS function, a shift system in which imaging lenses and the image sensor are relatively displaced in the directions perpendicular to the optical axis is employed. Bonding wires are used as energizing sections for the image sensor. Furthermore, a ball guide is used as a section that supports a movable part. Although balls for AF are not illustrated in the diagram, balls (shaft may be employed) for guide exist at positions invisible from the section. The above is the same as the embodiment example 2-3. The difference from the embodiment example 2-3 is that a shape memory alloy (SMA) is used as a drive section in the embodiment example 2-4 whereas the magnetic force is used as a drive section in the embodiment example 2-3. The present disclosure can be applied also to an image sensor actuator using an SMA as a drive section.

A gyro sensor that is not illustrated in the diagram is used for detection of the amount of camera shake and the gyro sensor is mounted on a substrate of the camera module, a substrate of portable equipment, or other substrates. In order to carry out feedback control of an OIS movable part according to the amount of camera shake by the gyro sensor, the camera module 81 includes a position detecting section configured to detect the position of the OIS movable part. The resistance value of an SMA material may be used as the position detecting section. Furthermore, the camera module 81 may include a position detecting section also regarding AF.

The camera module 81 includes an AF actuator 83 for driving an image sensor 82 in the optical axis direction and an OIS actuator 84 for driving the whole of the AF actuator 83 in the directions perpendicular to the optical axis.

Imaging lenses 85 are housed in a lens barrel 86. Although being represented as three lenses in the diagram, the imaging lenses 85 may be four or more lenses or may be two or less lenses. The lens barrel 86 is positioned and mounted in a base 87. That is, the imaging lenses 85 are fixed and are not moved for AF and OIS.

The image sensor 82 is covered by a sensor cover 88. An opening exists at a central part of the upper surface side of the sensor cover 88 and the opening is closed by an IR cut glass 89. At least a light receiving part of the image sensor 82 exists inside a region surrounded by the sensor cover 88 and the IR cut glass 89 and adhesion of a foreign matter to the light receiving part is prevented. The sensor cover 88 is supported with respect to an AF base 90 by the balls that are not illustrated in the diagram movably in the Z-axis direction in the diagram. The sensor cover 88 is subjected to such pressurization as to be pressed in the downward direction in the diagram by a pressuring spring 91. The space between the sensor cover 88 and the AF base 90 is bridged by SMA wires 92 for AF. When a current is applied to the SMA wires 92 for AF, the temperature of the SMA wires 92 for AF rises due to resistive heating thereof and the SMA wires 92 for AF contract. Due to this, a force that overcomes the reaction force of the pressurizing spring is generated and the sensor cover 88 is pulled up in the upward direction in the diagram. The position of the sensor cover 88 is determined by the balance between the force of the pressuring spring 91 and the contraction force of the SMA wires 92 for AF. When the amount of current applied to the SMA wire is reduced, the force of the pressuring spring 91 exceeds the contraction force and the sensor cover 88 is displaced in the downward direction in the diagram.

The AF base 90 is supported with respect to the base 87 by balls 93 for OIS movably in the X- and Y-axis directions in the diagram. In the diagram, a structure is illustrated in which the balls 93 for OIS have a one-layer structure and roll in two-axis directions of X and Y. However, a structure may be employed in which balls are provided with a two-layer structure and roll in one axis direction in each one layer. The space between the AF base 90 and the base 87 is bridged by a pair of left and right SMA wires 94a and 94b for OIS. The SMA wires 94a and 94b for OIS in the diagram are SMA wires for driving in the X-axis direction and SMA wires for driving in the Y-axis direction that are not illustrated in the diagram also exist in a direction shifted by 90 degrees. A bias current is made to flow in the left and right SMA wires 94a and 94b for OIS and both pull each other to make balance. Here, for example, assuming that the current of the left SMA wire 94a for OIS is increased and the current of the right SMA wire 94b for OIS is decreased, the left SMA wire 94a for OIS contracts and the right SMA wire 94b for OIS expands by the force of the contraction. Thus, the AF base 90 moves leftward in the diagram. When increase and decrease in the current are carried out in an opposite manner, the AF base 90 moves rightward in the diagram. By the above, the image sensor 82 can be driven in the X-axis direction. Driving in the Y-axis direction is also carried out similarly.

A module substrate 95 is disposed on the bottom surface of the base 87 and all electrical interconnect lines of the camera module 81 are finally integrated onto the module substrate 95. Because the image sensor 82 is mounted in the movable part, bonding wires 96 are used to electrically connect the image sensor 82 existing in the movable part and the module substrate 95 existing in the fixed part. The connecting parts between the image sensor 82 and the bonding wires 96 are located outside the region surrounded by the sensor cover 88. Although only each one bonding wire 96 is illustrated on the left and right sides in the diagram, actually a large number of bonding wires 96 are connected. The bonding wires 96 are very thin and the springiness of each one bonding wire 96 is also weak. Therefore, even when a large number of bonding wires 96 are collected, the influence of the springiness can be reduced as much as possible. Furthermore, the section of the bonding wire 96 has a substantially circular shape and the direction of the springiness when the bonding wire 96 bends does not exist. Thus, the influence of the springiness can be reduced even against motion in plural directions. This is effective when the image sensor 82 is driven in the three-axis directions particularly. Note that it is desirable that the connecting parts of the bonding wires 96 at both ends are fixed by a resin similarly to the embodiment example 2-1.

The whole of the camera module 81 is covered by a cover 97 and an opening 97a is made at the center of the cover 97 and serves as a path through which light is incident on the imaging lenses 85.

Embodiment Example 2-5

Figure 22:
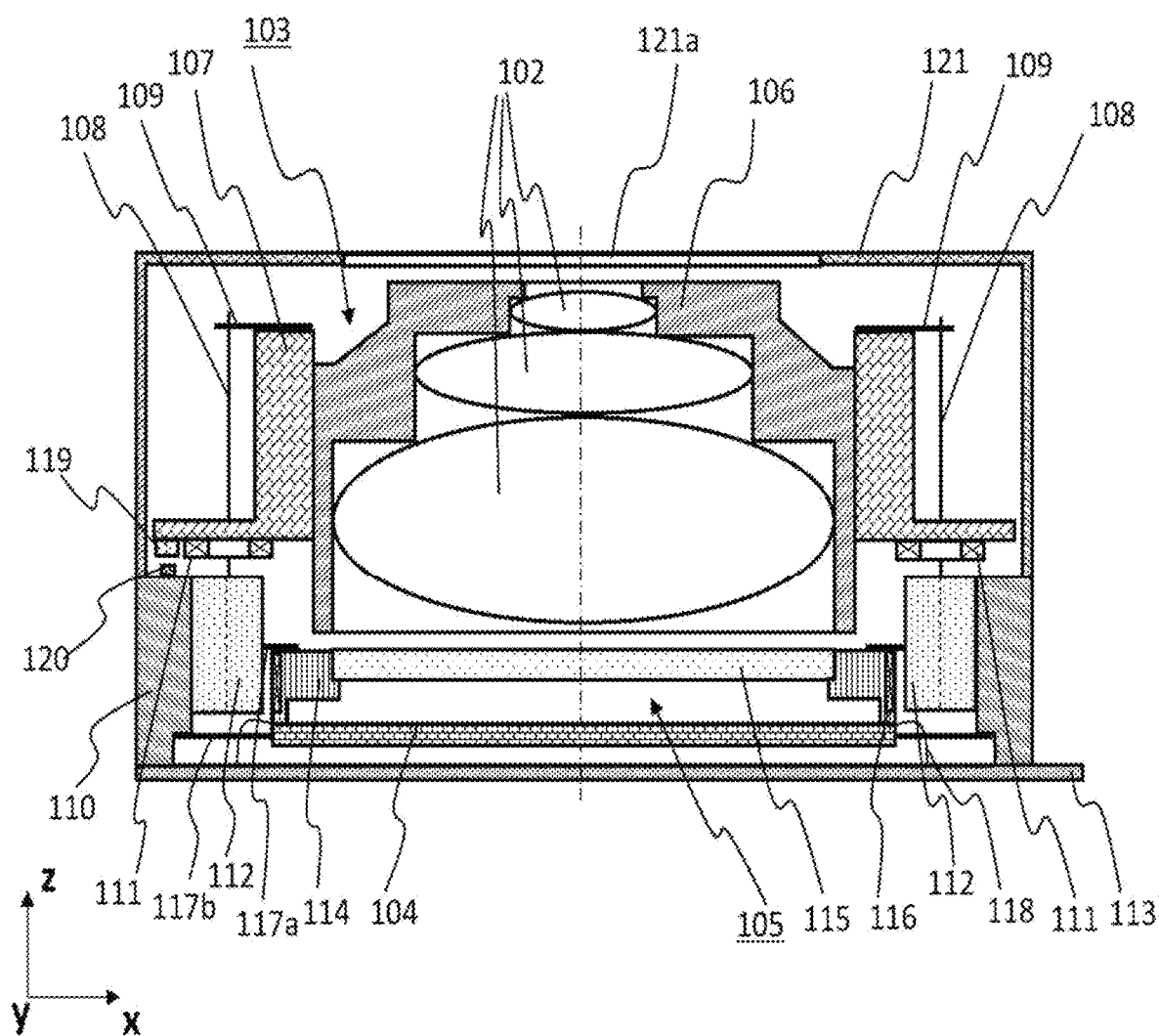
FIG. 22 is a central sectional view of a camera module according to an embodiment example 2-5 of the second embodiment.

In the embodiment example 2-2 to the embodiment example 2-4, the description has been made with the examples in which the imaging lenses are fixed and the image sensor is driven in the three-axis directions for AF and OIS. However, the present disclosure can be applied also to the case in which imaging lenses and an image sensor are employed as movable parts for the purpose of AF and for the purpose of OIS and are each driven separately. FIG. 22 is a central sectional view illustrating the schematic configuration of a camera module according to an embodiment example 2-5 of the present disclosure. In the embodiment example 2-5, an image sensor is driven in the optical axis direction for AF and imaging lenses are driven in the directions perpendicular to the optical axis for OIS. Furthermore, bonding wires are used for energization of the image sensor.

In FIG. 22, a camera module 101 includes an OIS actuator 103 for driving imaging lenses 102 in the directions perpendicular to the optical axis and an AF actuator 105 for driving an image sensor 104 in the optical axis direction of the imaging lenses.

The imaging lenses 102 are housed in a lens barrel 106. Although being represented as three lenses in the diagram, the imaging lenses 102 may be four or more lenses or may be two or less lenses. The lens barrel 106 is positioned and mounted in a lens holder 107. The lens holder 107 is supported by four suspension wires 108 movably in the directions (X-axis direction and Y-axis direction in the diagram) perpendicular to the optical axis. The suspension wires 108 are not directly connected to the lens holder 107 and the upper ends of the suspension wires 108 are connected through shock absorbing springs 109. The shock absorbing springs 109 are components for absorbing shock in the longitudinal direction of the suspension wire 108. The suspension wire 108 has a small permissible amount of expansion and contraction in the longitudinal direction and easily breaks due to the shock of a drop or other shock. Therefore, the shock absorbing spring 109 bends instead of expansion and contraction of the suspension wire 108 and prevents the breakage of the suspension wire 108. The lower ends of the suspension wires 108 are connected to a base 110 that is a fixed part. When being used for energization, the suspension wires 108 may be connected to an FPC (not illustrated) stuck to the base 110. In such a case, the upper ends and lower ends of the suspension wires 108 may be fixed to the shock absorbing springs 109 and the FPC, respectively, by solder. OIS coils 111 are fixed to the lower surface of the lens holder 107. Magnets 112 for driving are fixed to the base 110 in such a manner as to be opposed to the OIS coils 111. Magnetic flux from the magnet 112 for driving acts on the OIS coil 111 and a Lorentz force is generated through energizing the OIS coil 111, so that an OIS movable part composed of the imaging lenses 102, the lens barrel 106, the lens holder 107, the OIS coils 111, and so forth is driven in the directions perpendicular to the optical axis.

A module substrate 113 is disposed on the bottom surface of the base 110 and all electrical interconnect lines of the camera module 101 are finally integrated onto the module substrate 113. The image sensor 104 is covered by a sensor cover 114. An opening exists at a central part of the sensor cover 114 and the opening is closed by an IR cut glass 115. An AF coil 116 is wound around the side surface of the sensor cover 114. The sensor cover 114 is supported by upper and lower AF springs 117a and 117b movably in the optical axis direction (Z-axis direction in the diagram) relative to the fixed part (base 110). The magnets 112 for driving are disposed opposed to the AF coil 116. The magnet 112 for driving is used both as the magnet for OIS driving and as the magnet for AF driving. By sharing a common magnet for OIS and for AF as above, the number of components can be reduced. The magnetic flux from the magnet 112 for driving acts on the AF coil 116 and a Lorentz force is generated through energizing the AF coil 116, so that an AF movable part composed of the image sensor 104, the sensor cover 114, the IR cut glass 115, the AF coil 116, and so forth is driven in the optical axis direction. Note that, for energizing the AF coil 116 existing in the AF movable part, either or both of the upper and lower AF springs 117a and 117b may be used. Alternatively, bonding wires 118 may be used. Furthermore, for energizing the image sensor 104 existing in the AF movable part, a large number of energizing sections are necessary and therefore the bonding wires 118 are used. The number of bonding wires 118 is large. However, the springiness of each one bonding wire 118 is very weak and the influence of the springiness of the bonding wires 118 on the motion of the movable part is very small. Note that it is desirable that the connecting parts of the bonding wires 118 at both ends are fixed by a resin similarly to the embodiment example 2-1.

The embodiment example 2-5 includes a position detecting section for OIS. By detecting the position of the imaging lenses 102 and feeding back the position to use it for position control, the accuracy of positioning to a target position can be enhanced and the imaging lenses 102 can be held at a predetermined position even when disturbance vibration is received. The position detecting section for OIS is composed of a magnet 119 for position detection mounted on the OIS movable part (lens holder 107) and a Hall element 120 disposed on the fixed part (base 110) in such a manner as to be opposed to the magnet 119 for position detection. When the magnet 119 for position detection is displaced due to OIS driving, the magnitude of the density of magnetic flux incident on the Hall element 120 changes and is output as a position detection signal. In order to reduce the influence of magnetic flux from the magnet 112 for driving and the OIS coil 111, the Hall element 120 is disposed at a position somewhat separate from them. The Hall element 120 and terminals of the OIS coils 111 connected via the suspension wires 108 and so forth are connected to an actuator driver that is not illustrated in the diagram. The Hall element 120 may be an actuator driver in which a Hall element is incorporated. The actuator driver is a functional IC integrated on one semiconductor substrate. Note that the position detecting section for OIS illustrated in FIG. 22 is a position detecting section of the X-axis direction and a position detecting section for the Y-axis direction similarly exists in a direction shifted by 90 degrees.

The whole of the camera module 101 is covered by a cover 121. An opening 121a is made at the center of the cover 121 and serves as a path through which light is incident on the imaging lenses 102. The cover 121 has also a role as a stopper for mechanically restricting the movable range as the actuator and therefore it is desirable that the cover 121 is a metal.

Embodiment Example 2-6

Figure 23:
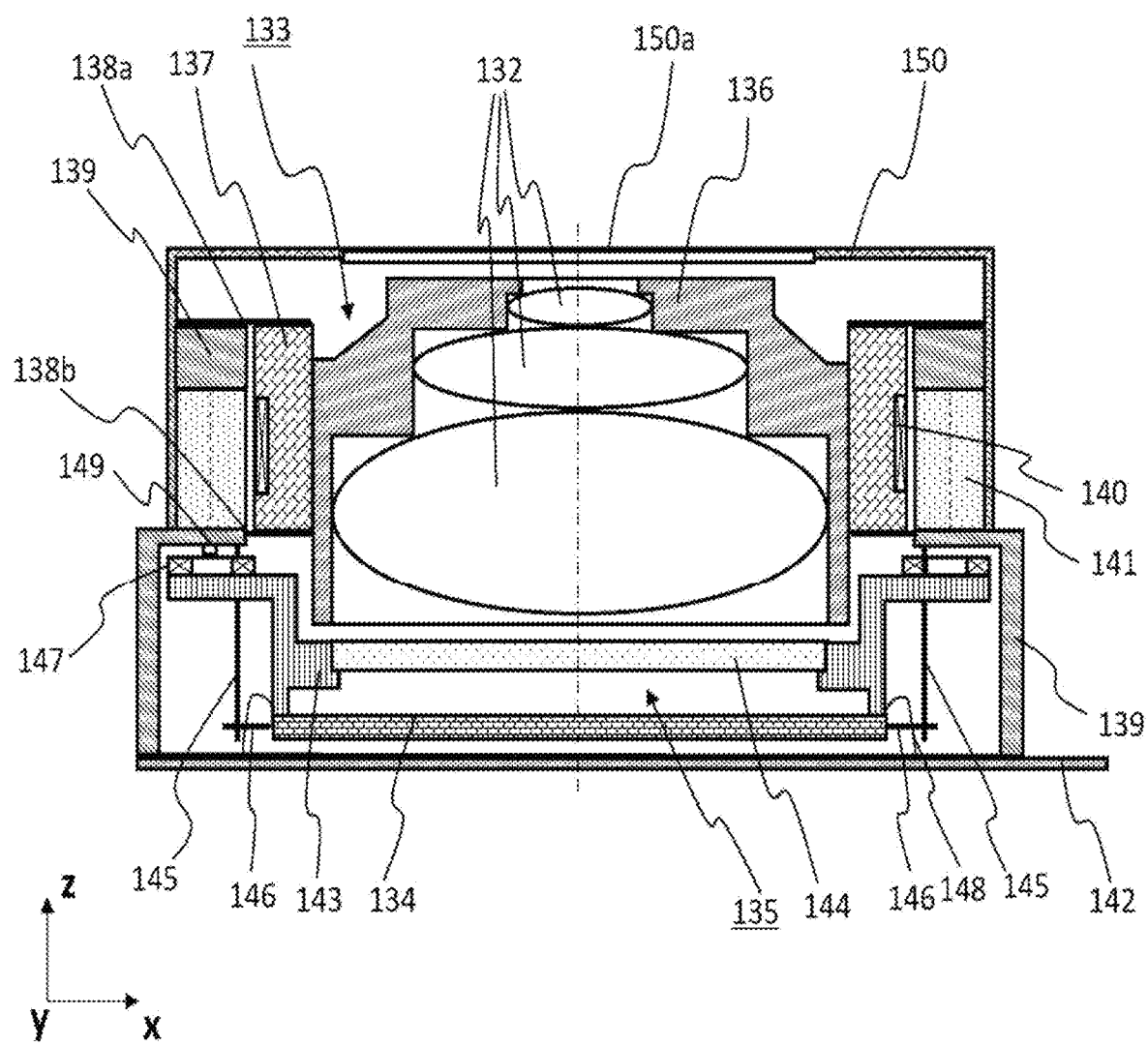
FIG. 23 is a central sectional view of a camera module according to an embodiment example 2-6 of the second embodiment.

In the embodiment example 2-5, the example has been depicted in which the imaging lenses are driven for OIS and the image sensor is driven for AF and bonding wires are used for energization of the image sensor in the AF movable part. However, the combination of the movable part and the driving direction may be reversed. FIG. 23 is a central sectional view illustrating the schematic configuration of a camera module according to an embodiment example 2-6 of the present disclosure. In the embodiment example 2-6, imaging lenses are driven in the optical axis direction for AF and an image sensor is driven in the directions perpendicular to the optical axis for OIS. Furthermore, bonding wires are used for energization of the image sensor.

In FIG. 23, a camera module 131 includes an AF actuator 133 for driving imaging lenses 132 in the optical axis direction and an OIS actuator 135 for driving an image sensor 134 in the directions perpendicular to the optical axis of the imaging lenses.

The imaging lenses 132 are housed in a lens barrel 136. Although being represented as three lenses in the diagram, the imaging lenses 132 may be four or more lenses or may be two or less lenses. The lens barrel 136 is positioned and mounted in a lens holder 137. The lens holder 137 is supported by upper and lower two AF springs 138a and 138b movably in the optical axis direction (Z-axis direction in the diagram) relative to a base 139. An AF coil 140 is wound around the side surface of the lens holder 137. Magnets 141 for driving are disposed opposed to the AF coil 140. Magnetic flux from the magnet 141 for driving acts on the AF coil 140 and a Lorentz force is generated through energizing the AF coil 140, so that an AF movable part composed of the imaging lenses 132, the lens barrel 136, the lens holder 137, the AF coil 140, and so forth is driven in the optical axis direction. Note that, for energizing the AF coil 140 existing in the AF movable part, either or both of the upper and lower AF springs 138a and 138b may be used.

A module substrate 142 is disposed on the bottom surface of the base 139 and all electrical interconnect lines of the camera module 131 are finally integrated onto the module substrate 142. The image sensor 134 is covered by a sensor cover 143. An opening exists at a central part of the sensor cover 143 and the opening is closed by an IR cut glass 144. The sensor cover 143 is supported by four suspension wires 145 movably in the directions (X-axis direction and Y-axis direction in the diagram) perpendicular to the optical axis relative to a fixed part (base 139). The suspension wires 145 are not directly connected to the sensor cover 143 and the lower ends of the suspension wires 145 are connected through shock absorbing springs 146. The shock absorbing springs 146 are components for absorbing shock in the longitudinal direction of the suspension wire 145. The suspension wire 145 has a small permissible amount of expansion and contraction in the longitudinal direction and easily breaks due to the shock of a drop or other shock. Therefore, the shock absorbing spring 146 bends instead of expansion and contraction of the suspension wire 145 and prevents the breakage of the suspension wire 145. The upper ends of the suspension wires 145 are connected to the base 139, which is the fixed part. OIS coils 147 are fixed to the upper surface of the sensor cover 143. The magnets 141 for driving are fixed to the base 139 in such a manner as to be opposed to the OIS coils 147. The magnet 141 for driving is used both as the magnet for OIS driving and as the magnet for AF driving. By sharing a common magnet for OIS and for AF as above, the number of components can be reduced. The magnetic flux from the magnet 141 for driving acts on the OIS coil 147 and a Lorentz force is generated through energizing the OIS coil 147, so that an OIS movable part composed of the image sensor 134, the sensor cover 143, the IR cut glass 144, the OIS coils 147, and so forth is driven in the directions perpendicular to the optical axis. For energizing the OIS coil 147 existing in the OIS movable part, the shock absorbing spring 146 and the suspension wire 145 may be used. Furthermore, for energizing the image sensor 134 existing in the OIS movable part, a large number of energizing sections are necessary and therefore the bonding wires 148 are used. The number of bonding wires 148 is large. However, the springiness of each one bonding wire 148 is very weak and the influence of the springiness of the bonding wires 148 on the motion of the movable part is very small. Note that it is desirable that the connecting parts of the bonding wires 148 at both ends are fixed by a resin similarly to the embodiment example 2-1.

The embodiment example 2-6 includes a position detecting section for OIS. By detecting the position of the image sensor 134 and feeding back the position to use it for position control, the accuracy of positioning to a target position can be enhanced and the image sensor 134 can be held at a predetermined position even when disturbance vibration is received. The position detecting section for OIS is composed of a magnet for position detection (this magnet exists on the far side of the OIS coil 147 and is invisible in the diagram) mounted on the OIS movable part (sensor cover 143) and a Hall element 149 disposed on the fixed part (base 139) in such a manner as to be opposed to the magnet for position detection. When the magnet for position detection is displaced due to OIS driving, the magnitude of the density of magnetic flux incident on the Hall element 149 changes and is output as a position detection signal. In order to alleviate the influence of magnetic flux from the magnet 141 for driving and the OIS coil 147, the Hall element 149 is disposed at a position somewhat separate from them (on the far side of the OIS coil 147 as described above). The Hall element 149 and terminals of the OIS coils 147 connected via the suspension wires 145 and so forth are connected to an actuator driver that is not illustrated in the diagram. The Hall element 149 may be an actuator driver in which a Hall element is incorporated. The actuator driver is a functional IC integrated on one semiconductor substrate. Note that the position detecting section for OIS illustrated in FIG. 23 is a position detecting section of the X-axis direction and a position detecting section for the Y-axis direction similarly exists in a direction shifted by 90 degrees.

The whole of the camera module 131 is covered by a cover 150. An opening 150a is made at the center of the cover 150 and serves as a path through which light is incident on the imaging lenses 132. The cover 150 has also a role as a stopper for mechanically restricting the movable range as the actuator and therefore it is desirable that the cover 150 is a metal. For example, if part of the upper surface of the lens holder 137 is protruded, the protruding part abuts against the inner surface of the cover 150 and the cover 150 works as the stopper when the AF movable part is displaced in the upward direction in FIG. 23. Because the magnets 141 for driving are disposed on the fixed part, the cover 150 may be a magnetic body. However, when the cover 150 is a magnetic body, it is desirable to separate the cover 150 from the magnet for position detection by a certain level of distance.

In the embodiment example 2-6, a mechanical stopper of OIS is formed through abutting of the side surface of the sensor cover 143 against the inner wall of the base 139.

The above camera modules are used for pieces of portable equipment such as smartphones, and so forth. In particular, one of suitable applications of the camera module of the embodiment of the present disclosure is a device having an optical image stabilization (OIS) function and an autofocus (AF) function, and it is effective to apply the camera module to a device in which the diameter of an imaging lens is made larger due to increase in the number of pixels particularly. By using the present disclosure, a camera module that allows lens position control with high accuracy and enables enhancement in the stabilization accuracy of image stabilization can be implemented even when the diameter of an imaging lens is made larger and a movable part becomes heavier.

It should be understood by those skilled in the art that various modifications, combinations, sub-combinations and alterations may occur depending on design requirements and other factors insofar as they are within the scope of the appended claims or the equivalents thereof.

What is claimed is:

1. A camera module, comprising:
a plurality of imaging lenses, wherein
each imaging lens of the plurality of imaging lenses is supported in such a manner as to be displaceable in a first direction, and
the plurality of imaging lenses moves in unison;
an image sensor supported in such a manner as to be displaceable in a second direction different from the first direction;
a first actuator including a first electromagnetic drive section configured to position each imaging lens of the plurality of imaging lenses in the first direction; and
a second actuator including a second electromagnetic drive section configured to position the image sensor in the second direction, wherein
the first electromagnetic drive section configured to position each imaging lens of the plurality of imaging lenses shares a magnet with the second electromagnetic drive section configured to position the image sensor,
an autofocus operation is carried out by one of the first actuator and the second actuator, and
an optical image stabilization operation is carried out by another of the first actuator and the second actuator.

2. The camera module according to claim 1, wherein
the first direction is a direction perpendicular to an optical axis of the plurality of imaging lenses, and
the second direction is an optical axis direction of the plurality of imaging lenses.

3. The camera module according to claim 1, wherein
the first direction is an optical axis direction of the plurality of imaging lenses, and
the second direction is a direction perpendicular to an optical axis of the plurality of imaging lenses.

4. The camera module according to claim 1, wherein at least one of the first actuator and the second actuator supports a movable part by an elastic body.

5. The camera module according to claim 4, wherein both the first actuator and the second actuator support the movable part by the elastic body.

6. The camera module according to claim 1, wherein the one of the first actuator and the second actuator that carries out the optical image stabilization operation includes a position detecting section configured to detect displacement of a movable part.

7. A camera module capable of carrying out at least one of an autofocus operation or an image stabilization operation by driving an image sensor, the camera module comprising:
a bonding wire, wherein
a first end of the bonding wire is electrically connected to the image sensor disposed in a movable part and a second end of the bonding wire is electrically connected to a module substrate disposed in a fixed part,
the bonding wire electrically connects the image sensor and the module substrate to energize the image sensor,
the bonding wire has a curved shape, and
the bonding wire is an energizing section for a device that is disposed in the movable part and is for driving.

8. The camera module according to claim 7, wherein vicinity of a connecting part between the image sensor and the bonding wire and vicinity of a connecting part between the module substrate and the bonding wire that are one part of the bonding wire are protected by a resin material.

9. The camera module according to claim 8, further comprising:
a sensor cover that covers a light receiving part of the image sensor, wherein
the light receiving part is disposed in the sensor cover, and
the connecting part between the image sensor and the bonding wire and the connecting part between the module substrate and the bonding wire are disposed outside the sensor cover.

10. The camera module according to claim 7, wherein the image sensor is driven in a plurality of directions for purposes of both the autofocus operation and the image stabilization operation.

11. The camera module according to claim 7, wherein the first end of the bonding wire is directly connected to the image sensor disposed in the movable part and the second end of the bonding wire is directly connected to the module substrate disposed in the fixed part.

12. The camera module according to claim 1, further comprising:
a module substrate; and
a movable part supported in such a manner as to be displaceable in the second direction different from the first direction, wherein
the image sensor is on the module substrate,
the movable part includes:
the image sensor,
a sensor cover that covers the image sensor, and
an infrared radiation cut glass on the image sensor, and
the second actuator is further configured to position the movable part in the second direction.

* * * * *